(12) United States Patent
Khosla et al.

(10) Patent No.: US 12,524,708 B1
(45) Date of Patent: Jan. 13, 2026

(54) SYSTEMS AND METHODS FOR TRAINING MACHINE LEARNING MODELS WITH USER-SPECIFIC KNOWLEDGE GRAPHS TO PREDICT OUTCOMES

(71) Applicant: CK12 Foundation, Menlo Park, CA (US)

(72) Inventors: Neeru Khosla, Portola Valley, CA (US); Adhitya Venkatesh, Sunnyvale, CA (US); Reza Shahbazi, Burlingame, CA (US)

(73) Assignee: CK12 Foundation, Menlo Park, CA (US)

( * ) Notice: Subject to any disclaimer, the term of this patent is extended or adjusted under 35 U.S.C. 154(b) by 0 days.

(21) Appl. No.: 18/740,464

(22) Filed: Jun. 11, 2024

Related U.S. Application Data

(60) Provisional application No. 63/507,871, filed on Jun. 13, 2023.

(51) Int. Cl.
   *G06N 20/00* (2019.01)
(52) U.S. Cl.
   CPC ................... *G06N 20/00* (2019.01)
(58) Field of Classification Search
   CPC ..................................................... G06N 20/00
   See application file for complete search history.

(56) References Cited

U.S. PATENT DOCUMENTS

| | | |
|---|---|---|
| 10,037,707 B2 | 7/2018 | Ashby |
| 11,275,903 B1 | 3/2022 | McInnis |
| 11,898,865 B1 | 2/2024 | Bhavsar et al. |
| 11,966,702 B1 | 4/2024 | Wilkinson et al. |
| 12,277,154 B1 | 4/2025 | Khosla et al. |
| 12,353,444 B1 | 7/2025 | Khosla et al. |
| 2007/0136273 A1 | 6/2007 | Rehberg et al. |
| 2007/0269788 A1 | 11/2007 | Flowers et al. |
| 2009/0202969 A1 | 8/2009 | Beauchamp et al. |

(Continued)

OTHER PUBLICATIONS

Schmucker, Robin, et al. "Assessing the performance of online students—new data, new approaches, improved accuracy." arXiv preprint arXiv:2109.01753 (2021). (Year: 2021).*

(Continued)

*Primary Examiner* — Kevin W Figueroa
(74) *Attorney, Agent, or Firm* — COOLEY LLP

(57) ABSTRACT

A method includes receiving interaction data including more than one interaction type and providing the interaction data to a first machine learning model to generate a vector representation defining similarity measures between subsets of the interaction data and update a knowledge graph. The method includes retrieving data associated with a user based on a target associated with a prediction associated with a capability level the user and providing inputs to multiple machine learning models to define relative complexity scores, pseudoguessing weights, and an item discrimination index, which are provided to a transformer trained on the knowledge graph to generate at least one prediction. The method includes providing the at least one prediction to a machine learning model to generate a plurality of simulations. The method includes identifying, based on the plurality of simulations, a prediction associated with a capability level of the user.

21 Claims, 7 Drawing Sheets

(56) References Cited

U.S. PATENT DOCUMENTS

| | | |
|---|---|---|
| 2012/0219938 A1 | 8/2012 | Al-Shammari |
| 2014/0335499 A1 | 11/2014 | Miele |
| 2016/0071022 A1 | 3/2016 | Bruno et al. |
| 2018/0131645 A1 | 5/2018 | Magliozzi et al. |
| 2018/0218268 A1 | 8/2018 | Kozloski et al. |
| 2018/0232247 A1 | 8/2018 | Potter et al. |
| 2019/0197415 A1 | 6/2019 | Bulut et al. |
| 2019/0294694 A1 | 9/2019 | Dash et al. |
| 2021/0174239 A1 | 6/2021 | Liao et al. |
| 2021/0264520 A1 | 8/2021 | Cummings |
| 2023/0065870 A1 | 3/2023 | Pyzow et al. |
| 2023/0080235 A1 | 3/2023 | Gil Ramos et al. |
| 2023/0177402 A1 | 6/2023 | Goodsitt et al. |
| 2023/0185820 A1 | 6/2023 | Benoit |
| 2023/0244934 A1* | 8/2023 | Lazaridou ............... G06N 3/08 706/25 |
| 2024/0126794 A1 | 4/2024 | Cook |

OTHER PUBLICATIONS

Kong, Siu-Cheung, and Ming Lai. "Validating a computational thinking concepts test for primary education using item response theory: An analysis of students' responses." Computers & Education 187 (2022): 104562. (Year: 2022).*

Wang, Min. Characteristics of item response time for standardized achievement assessments. Diss. Doctoral dissertation]. University of Iowa, 2017. (Year: 2017).*

Kornbrot, Diana. "Point biserial correlation." Wiley StatsRef: Statistics Reference Online (2014). (Year: 2014).*

Marinho, Wemerson, et al. "Predicting Item Response Theory Parameters Using Question Statements Texts." LAK23: 13th International Learning Analytics and Knowledge Conference. 2023. (Year: 2023).*

Abu-Salih et al., "A systematic literature review of knowledge graph construction and application in education," Heliyon. Feb. 1, 2024, 10(3): e25383, pp. 1-23. Published online Feb. 1, 2024.

Alhothali et al., "Predicting Student Outcomes in Online Courses Using Machine Learning Techniques: A Review," Sustainability. May 19, 2022; 14(10):6199, pp. 1-23.

Choi et al., "Towards an Appropriate Query, Key, and Value Computation for Knowledge Tracing," L@S '20: Proceedings of the Seventh ACM Conference on Learning @ Scale, Aug. 12-14, 2020, Virtual Event, USA, arXiv:2002.07033v5, https://arxiv.org/pdf/2002.07033v5, 9 pages.

Ettorre et al., "A Knowledge Graph Enhanced Learner Model to Predict Outcomes to Questions in the Medical Field," HAL Open Science, EKAW 2020—22nd International Conference on Knowledge Engineering and Knowledge Management, Sep. 2020, Bolzano, Italy, https://inria.hal.science/hal-02915414, 16 pages.

Kannan et al., "Graph Neural Networks for Predicting Student Performance: A Deep Learning Approach for Academic Success Forecasting," International Journal of Intelligent Systems and Applications in Engineering (IJISAE). 2024, 12(1s), pp. 228-232.

Liu et al., "Improving Knowledge Tracing via Pre-training Question Embeddings," arXiv:2012.05031v1, https://arxiv.org/pdf/2012.05031, Dec. 9, 2020, 7 pages.

Persaud, "Bloom's Taxonomy: The Ultimate Guide [Free Download], Gain a deep understanding of Bloom's taxonomy and how it can be effectively applied in the learning process to benefit both educators and learners," Top Hat Blog. May 15, 2024, retrieved on Jun. 21, 2024 at https://tophat.com/blog/blooms-taxonomy/, 11 pages.

Wu et al., "SGKT: Session graph-based knowledge tracing for student performance prediction," Expert Systems with Applications. Jun. 15, 2022, vol. 206, 117681, 12 pages.

Akhtar et al. "Detecting fake news and disinformation using artificial intelligence and machine learning to avoid supply chain disruptions." Annals of Operations Research. Aug. 2023;327(2):633-57.

Alruwais et al. "Evaluating Student Knowledge Assessment Using Machine Learning Techniques." Sustainability. 2023; 15(7):6229, 25 pages.

Author Unknown. "College Tools. Leveraging AI for Effective University Exam Preparation: A Report." [online blog]. Retrieved from the Internet on Aug. 15, 2024. URL: https://www.collegetools.io/blog/leveraging-ai-for-effective-university-exam-preparation:-a-report, 6 pages.

Ayouni et al. "A new ML-based approach to enhance student engagement in online environment." Plos one. Nov. 10, 2021;16(11):e0258788, 16 pages.

Benedetto, Luca "Tackling Misinformation with Machine Learning." SWForum.eu [online forum]. Retrieved from the Internet on Aug. 15, 2024. URL: https://swforum.eu/online-sw-forum/software-technology/6/tackling-misinformation-machine-learning. 25 pages.

Chance et al. "Using AI to Help Students Prepare for the SAT Creating college entrance exam prep materials can take a lot of time, but artificial intelligence tools make the process easier." Edutopia.org. Nov. 9, 2023. Retrieved from the Internet. URL: https://www.edutopia.org/article/using-ai-sat-prep-lessons/, 11 pages.

Christopher, James "How to Raise Your Test Scores with Help of AI Simulations." [online blog]. Retrieved from the Internet on Aug. 15, 2024. URL: https://jameschris.medium.com/how-to-raise-your-test-scores-with-help-of-ai-simulation-8ef210e9a46f, 12 pages.

Cooper, Colin "How AI and Machine Learning Are Revolutionising Customer Engagement." [online blog] Jun. 27, 2023. Retrieved from the Internet. URL: https://medium.com/@colin-cooper/how-ai-and-machine-learning-are-revolutionising-customer-engagement-6552ea6ad146, 10 pages.

Co-pending U.S. Appl. No. 18/827,005, inventors Khosla; Vinod et al., filed Sep. 6, 2024.

Co-pending U.S. Appl. No. 18/887,313, inventors Khosla; Neeru et al., filed Sep. 17, 2024.

Gimpel et al. "Unlocking the power of generative AI models and systems such as GPT-4 and ChatGPT for higher education: A guide for students and lecturers." Hohenheim Discussion Papers in Business, Economics and Social Sciences No. 02-2023; 2023, 57 pages.

Kumar et al. "Identification and Addressal of Knowledge Gaps in Students." In 2022 3rd International Conference for Emerging Technology (INCET) May 27, 2022, 6 pages.

Matthews, Ed. "How Can AI Tools Improve Student Assessment Outcomes?" Open Assessment Technologies, TAO. 2023. [online]. Retrieved from the Internet. URL: https://www.taotesting.com/blog/how-can-ai-tools-improve-student-assessment-outcomes/, 9 pages.

Ruiz, Armand "AI for Personalized Learning System for Students." [online blog]. Jun. 3, 2023. Retrieved from the Internet. URL: https://www.nocode.ai/personalized-learning-system-for-students/, 10 pages.

Ruiz-Rojas et al. "Empowering Education with Generative Artificial Intelligence Tools: Approach with an Instructional Design Matrix." Sustainability. Jul. 25, 2023;15(15):11524, 20 pages.

Sekeroglu et al. "Systematic Literature Review on Machine Learning and Student Performance Prediction: Critical Gaps and Possible Remedies." Applied Sciences. Nov. 18, 2021;11(22):10907, 23 pages.

Toti et al. "Detection of Student Engagement in e-Learning Systems Based on Semantic Analysis and Machine Learning." In Advances on P2P, Parallel, Grid, Cloud and Internet Computing: Proceedings of the 15th International Conference on P2P, Parallel, Grid, Cloud and Internet Computing (3PGCIC-2020) 15 2021, 13 pages (pp. 211-223).

Co-pending U.S. Appl. No. 19/080,004, inventors Khosla; Vinod et al., filed Mar. 14, 2025.

Co-pending U.S. Appl. No. 19/193,653, inventors Khosla; Neeru et al., filed Apr. 29, 2025.

\* cited by examiner

300

Create a representation associated with a behavior of one or more students
305

Pre-train an answer prediction model based on the representation
310

Receive a query for an answer prediction
315

Generate, using the answer prediction model, the answer prediction
320

Store the answer prediction
325

Present the answer prediction
330

Retrain the answer prediction model, the skill prediction model, and/or the remediation model
335

```
┌─────────────────────────────────────────────────────────┐
│ Create a representation associated with a behavior of   │
│ one or more students                                    │
│ 405                                                     │
└─────────────────────────────────────────────────────────┘
                            ↓
┌─────────────────────────────────────────────────────────┐
│ Pre-train a remediation model based on the representation│
│ 410                                                     │
└─────────────────────────────────────────────────────────┘
                            ↓
┌─────────────────────────────────────────────────────────┐
│ Receive a query for an action plan                      │
│ 415                                                     │
└─────────────────────────────────────────────────────────┘
                            ↓
┌─────────────────────────────────────────────────────────┐
│ Generate, using the remediation model, the action plan  │
│ 420                                                     │
└─────────────────────────────────────────────────────────┘
                            ↓
┌─────────────────────────────────────────────────────────┐
│ Store the action plan                                   │
│ 425                                                     │
└─────────────────────────────────────────────────────────┘
                            ↓
┌─────────────────────────────────────────────────────────┐
│ Present the action plan                                 │
│ 430                                                     │
└─────────────────────────────────────────────────────────┘
                            ↓
┌─────────────────────────────────────────────────────────┐
│ Monitor compliance with the action plan                 │
│ 435                                                     │
└─────────────────────────────────────────────────────────┘
                            ↓
┌─────────────────────────────────────────────────────────┐
│ Retrain the answer prediction model, the skill prediction│
│ model, and/or the remediation model                     │
│ 440                                                     │
└─────────────────────────────────────────────────────────┘
```

FIG. 4

SYSTEMS AND METHODS FOR TRAINING MACHINE LEARNING MODELS WITH USER-SPECIFIC KNOWLEDGE GRAPHS TO PREDICT OUTCOMES

CROSS-REFERENCE TO RELATED APPLICATIONS

This application claims priority to and benefit of U.S. Provisional Patent Application No. 63/507,871, titled "SYSTEMS AND METHODS FOR MACHINE LEARNING MODELS USING KNOWLEDGE GRAPHS AND ENGAGEMENT DATA TO PREDICT A FUTURE OUTCOME," filed Jun. 13, 2023, the disclosure of which is incorporated herein by reference.

BACKGROUND

The embodiments described herein relate to systems and methods for machine learning models (e.g., neural network based models) using knowledge graphs and engagement data to predict outcomes, performance and/or skill levels of a user.

Some known machine learning models can be used to predict outcomes. In certain contexts, however, such known machine learning models can be prone to error and can define erroneous connections between input data. This can lead to less than desirable results.

Accordingly, a need exists for machine learning models that can produce more relevant and accurate predictions.

SUMMARY

In one embodiment, a non-transitory processor-readable medium stores code representing instructions to be executed by one or more processors. The instructions include code to cause the one or more processors to receive interaction data associated with a user, the interaction data including more than one interaction type and provide the interaction data as input to a first machine learning model to generate a vector representation of the interaction data, the vector representation defining similarity measures between subsets of the interaction data regardless of interaction type. The instructions further include code to cause the one or more processor to update, based on the vector representation, a knowledge graph and retrieve, based on a target for a prediction associated with a capability level of the user, data associated with the user. The instructions further include code to cause the one or more processors to provide the target as input to a second machine learning model to define a relative complexity score for the data associated with user, provide a format associated with the data associated with the user as input to a third machine learning model to generate pseudoguessing weights for the data associated with the user, and provide point-biserial correlation coefficients associated with the data as input to a fourth machine learning model to generate an item discrimination index for the data associated with the user. The instructions further include code to cause the one or more processors to generate at least one prediction associated with the target by providing the relative complexity score, the pseudoguessing weights, and the item discrimination index as input to an auto regressive transformer trained on the knowledge graph. The instructions further include code to cause the one or more processors to provide the at least one prediction as input to a fifth machine learning model to generate a plurality of simulations, and identify, based on the plurality of simulations, the prediction associated with the capability level of the user In one embodiment, a non-transitory processor-readable medium stores code representing instructions to be executed by one or more processors. The instructions include code to cause the one or more processors to receive interaction data, the interaction data including more than one interaction type and provide the interaction data to as an input to a first machine learning model to generate a vector representation of the interaction data, the vector representation defining similarity measures between subsets of the interaction data regardless of interaction type. The instructions further include code to cause the one or more processors to generate, based on the vector representation, a knowledge graph, and train a transformer based on the knowledge graph and retrieve, based on a target for a prediction associated with a capability level of a user, data associated with the user. The instructions further include code that cause the one or more processors to provide as context associated with the target as an input to a second machine learning model to define a relative complexity score for the data associated with user, provide a format associated with the data associated with the user as an input to a third machine learning model to define pseudoguessing weights for the data associated with the user, and provide point-biserial correlation coefficients associated with the data as an input to a fourth machine learning model to define an item discrimination index for the data associated with the user based on. The instructions further include code that cause the one or more processors to generate at least one prediction associated with the target by providing the relative complexity score, the pseudoguessing weights, and the item discrimination index as an input to the transformer. The instructions further include code that cause the one or more processors to provide the at least one prediction to a fifth machine learning model to generate a plurality of simulations, and identify, based on the plurality of simulations, the prediction associated with the capability level of the user.

In one embodiment, an apparatus include one or more memories and one or more processors operatively coupled to the one or more memories. The one or more processors configured to retrieve, based on a target for a prediction associated with a capability level of a user, data associated with the user, the data associated with a knowledge graph. The one or more processors are configured to provide the target as an input to a first machine learning model to generate a vector representation of the target. The one or more processors are configured to update the knowledge graph based on the vector representation. The one or more processors are configured to provide a context associated with the target as an input to a second machine learning model to define a relative complexity score for the data associated with the user. The one or more processors are configured to provide a format associated with the data associated with the user as an input to a third machine learning model to define pseudoguessing weights for the data associated with the user. The one or more processors are configured to provide point biserial correlation coefficients associated with the data to a fourth machine learning model to define an item discrimination index for the data associated with the user. The one or more processors are configured to generate at least one prediction associated with the target by providing the relative complexity score, the pseudoguessing weights, and the item discrimination index as an input to a transformer trained on the knowledge graph. The one or more processor are configured to provide the at least one prediction to a fifth machine learning model to generate a plurality of simulations.

The one or more processors are configured to identify, based on the plurality of simulations, the prediction associated with the capability level of the user.

BRIEF DESCRIPTION OF THE DRAWINGS

FIG. 3 shows a flowchart for a method of generating an answer prediction using the system of FIG. 1.

FIG. 4 shows a flowchart for a method of generating an action plan using the system of FIG. 1.

DETAILED DESCRIPTION

Figure 1:
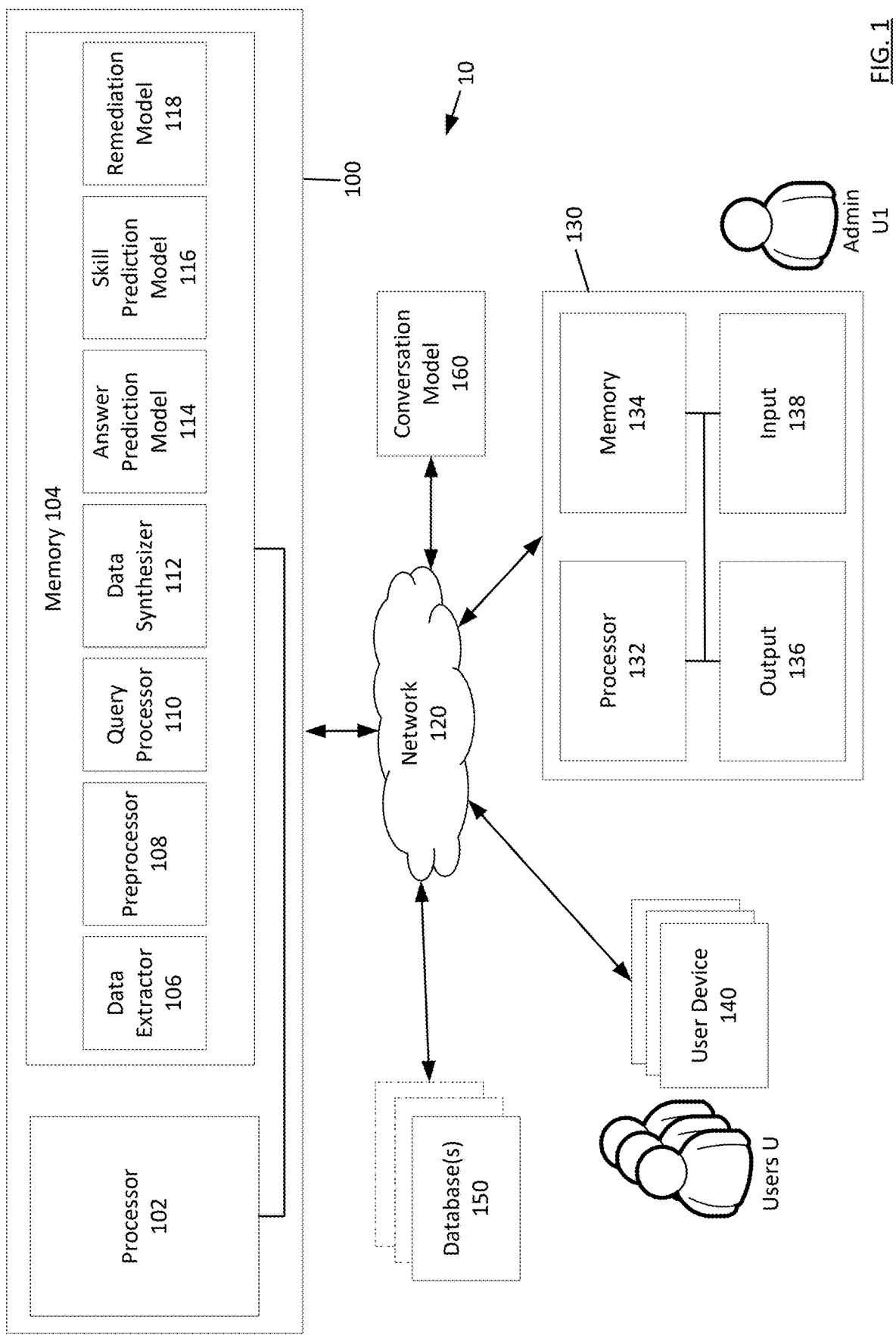
FIG. 1 shows a block diagram for a system for predicting future performance, according to an example embodiment.

In some embodiments, a machine learning model is generated to predict a future outcome, performance and/or skill level (e.g., proficiency, execution ability, capability, etc.). A method includes, receiving a query for a prediction associated with a skill level of a user in an identified context. The method includes by using the query as an input to a first machine learning model trained using a knowledge graph, generate a prediction to each question from a set of questions associated with the context. The prediction for each question from the set of questions is a probability that the user will answer that question from the set of questions correctly. The method further includes using the prediction as an input to a second machine learning model, generating a set of simulations using the prediction for each question from the set of questions; identifying, based on the set of simulations, the prediction associated with the skill level; and providing an indication of the prediction to inform an action for the user to increase the skill level.

In some embodiments, a method of predicting a future outcome, performance and/or skill level includes generating a skill prediction model for a user, which includes the steps of receiving a query for a skill prediction; processing the query to form a processed query; determining a subject matter and difficulty associated with the processed query; transmitting the processed query to an answer prediction model, a skill prediction model, and/or a remediation model; generating, by the answer prediction model, a sample question related to the processed query; predicting a performance for the user on the sample question, thus generating an answer prediction; providing the answer prediction to the skill prediction model; generating a skill prediction based on the answer prediction; and presenting the skill prediction to the provider of the query.

In some implementations, an answer prediction model and a skill prediction model are used to predict outcomes and/or skill levels, such as a user's future academic performance. In some embodiments, the user can be a student. In such a context, for example, the answer prediction model generates an answer prediction, which is a prediction of how a user will do on a particular question. The answer prediction model may generate an answer prediction for multiple users and for multiple questions. The skill prediction model generates a skill prediction, which is a prediction of how well a user will understand a topic. In some instances, the skill prediction model can generate a skill prediction for a user in a topic for which the user has received no previous instruction.

Learning can be achieved using various mediums, including reading books, watching videos, listening to audio, and so forth. Traditionally, to determine how much a user knows about a particular topic, users are given various forms of tests and exams. These exams can include multiple choice questions, essay responses, fill-in-the-blank questions, and so on. These tests are usually administered at the end of the user's time studying a particular subject, such as at the end of a unit, the end of a semester, or the end of a school year.

Arguments have been presented that providing tests in this way does not afford the user an accurate opportunity to demonstrate his or her knowledge in a particular subject matter area. Accordingly, various theories, such as classical test theory, try to statistically account for variations in a user's performance on test day to more accurately assess a user's understanding of particular concepts.

As technology advances, more learning and testing is done using computers and other technology. Many types of exams, including entrance exams for professional schools, are now administered online. And much of the learning for those exams also occurs on digital platforms.

As learning happens more and more in digital environments, there is a growing need and expectation that a user's understanding of certain concepts and subject matter areas can be measured with greater accuracy.

FIG. 1 shows a block diagram of a system 10 for processing data to predict a user's (or other user's) future performance and future skill level, according to an embodiment. The system 10 includes a prediction system 100, a network 120, an admin device (e.g., primary compute device, hub, superior device, first compute device) 130, user devices (e.g., secondary compute device(s), node(s), etc.) 140, databases 150, and a conversation model 160. In some embodiments, the system 10 is associated with an entity (commercial entity, educational entity, etc.), including and/or associated with admin U1 and/or users U.

The network 120 facilitates communication between the components of the system 10. The network 120 can be any suitable communication network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In some instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted.

In some instances, the network 120 can include multiple networks or subnetworks operatively coupled to one another by, for example, network bridges, routers, switches, gateways and/or the like (not shown).

The admin device 130 is configured to generate, view, and/or complete actions by a admin U1. The admin device 130 includes a processor 132, a memory 134, an output 136, and an input 138, each operatively coupled to one another (e.g., via a system bus) and each in communication with the network 120. In some implementations, the admin device 130 is associated with (e.g., owned by, accessible by, operated by, etc.) the admin U1. The admin U1 can be any type of user, such as, for example, a teacher, a professor, a school, an administrator, a manager, an employee, a customer, an operator, and/or the like. While the system 10 shown in FIG. 1 as including one admin device 130, in some embodiments the system 10 includes multiple admin devices, each associated with one or more users and each in communication with the prediction system 100 via the network 120.

The processor 132 of the admin device 130 may be a hardware-based integrated circuit (IC) or any other suitable processing device configured to run and/or execute a set of instructions or code. In some implementations, the processor 132 is a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 is operatively coupled to and in communication with the memory 134, the display 136, the input 138, and the network 120, such as through a system bus (e.g., address bus, data bus, control bus, etc.) and/or a wireless connection.

The memory 134 of the admin device 130 may be a random-access memory (RAM), a memory buffer, a hard drive (e.g., solid state drive (SSD), hard disk drive (HDD), etc.), a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 includes extendable storage units that can be added and used incrementally. In some implementations, the memory 134 can be a portable memory (e.g., a flash drive, a portable hard disk, and/or the like) that can be operatively coupled to the processor 132. In some embodiments, the memory 134 can be remotely operatively coupled with a compute device separate from (e.g., detached from) the admin device 130. For example, a remote database device can serve as a memory and be operatively coupled to the admin device 130.

Figure 6:
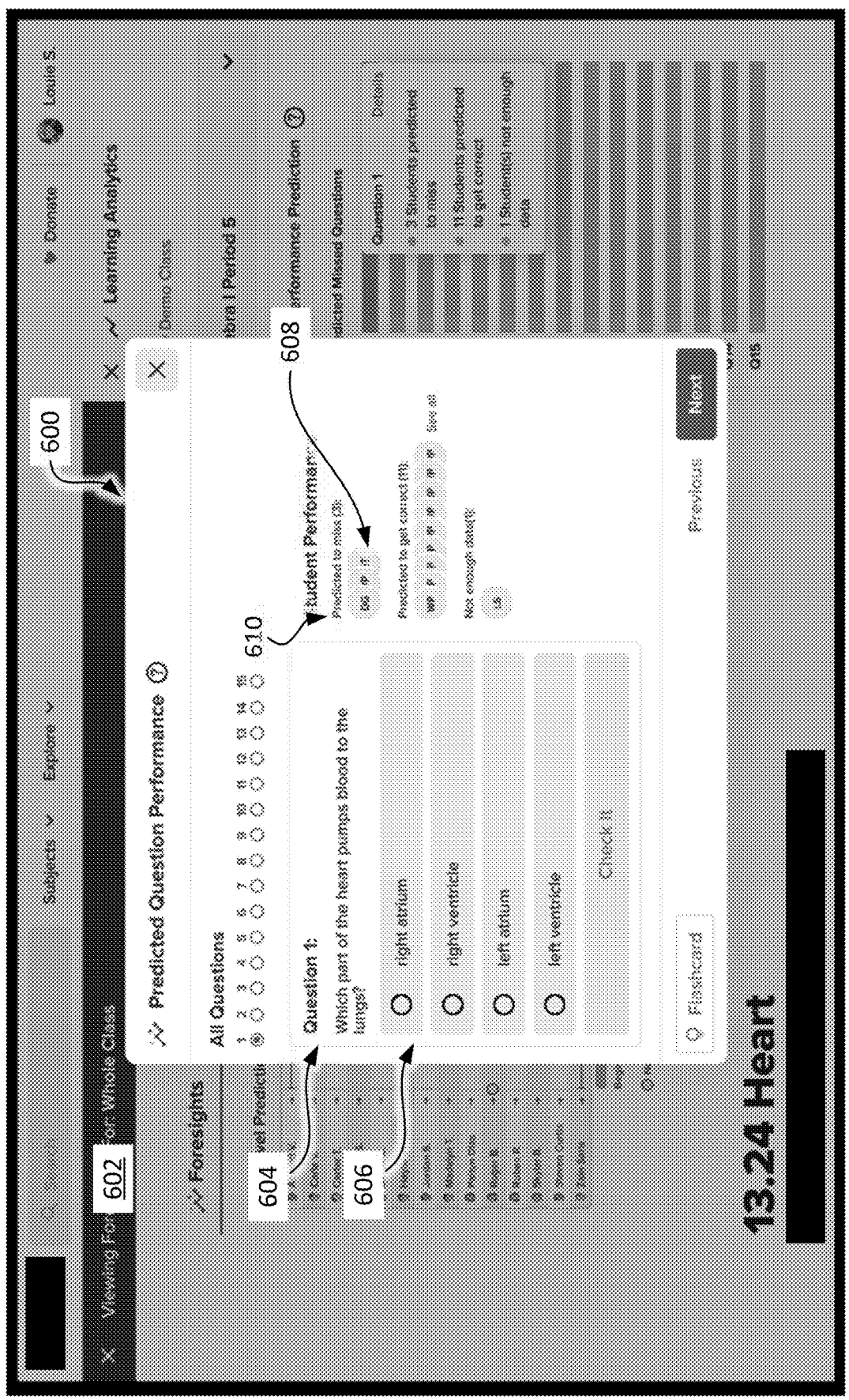
FIG. 6 shows an answer prediction displayed on a computing device, according to an example embodiment.
Figure 7:
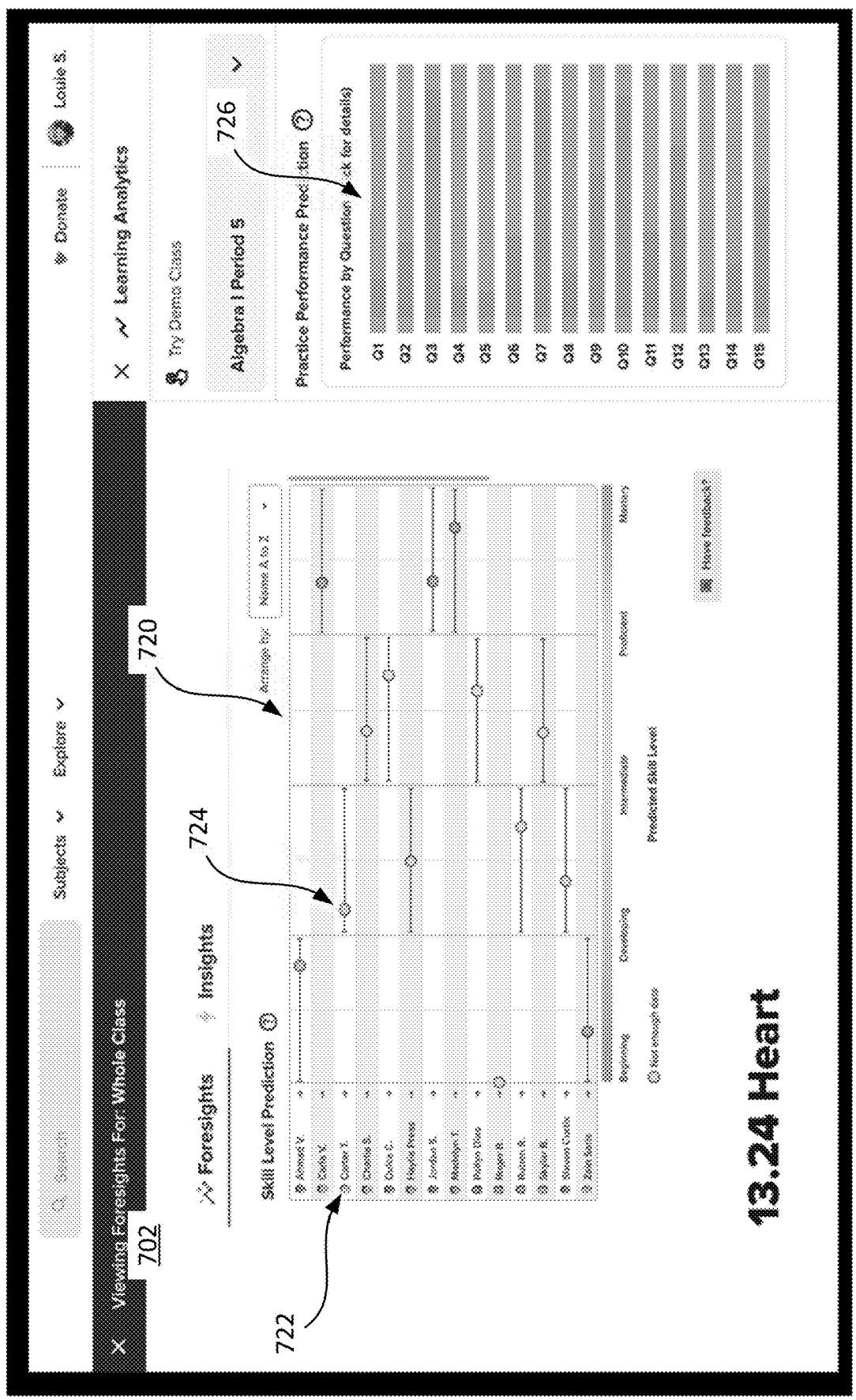
FIG. 7 shows a skill prediction displayed on a computing device, according to an example embodiment.

The output 136 is operatively coupled to the processor 132 and is configured to present (e.g., display, provide, etc.) information to admin U1. For example, in response to the prediction system 100 generating a future user skill prediction, processor 132 can receive the future user skill prediction and the output 136 can present the future user skill prediction to the admin U1. In some implementations, the output 136 is a display, such as a Cathode Ray tube (CRT) display, Liquid Crystal Display (LCD), Light Emitting Diode (LED) display, Organic Light Emitting Diode (OLED) display, and/or other displays configured to present information visually. Example outputs that can be displayed by the display 136 are shown in FIGS. 6 and 7, which are described in further detail herein. In some implementations, the output 136 is a speaker or other audio output device configured to present information to the admin U1, such as the future user skill prediction, aurally. In some implementations, the output 136 is configured to provide feedback to the admin U1 via haptic feedback.

The input 138 is operably coupled to the processor 132 and is configured to provide a signal to the processor 132 to complete a task. In some implementations, the input 138 is a peripheral device, such as a mouse, keyboard, global positioning system (GPS), microphone, touch screen, speaker, scanner, headset, camera, and/or the like. In some instances, the admin U1 can use the input 138 to send information to the prediction system 100 via the network 120, such as a knowledge graph or a location of the admin device 130. In some instances, the input 138 is configured to provide a request for information (e.g., query, target, etc.) to the prediction system 100 via the network, such as a request for a future user skill prediction.

In some implementations, each of the user devices 140 can be substantially similar to the admin device 130. The user devices 140 include a processor similar to the processor 132, a memory similar to the memory 134, an output device similar to the output 136, and an input device similar to the input 138. The user devices 140 are configured to send and receive information from the prediction system 100 via the network 100. The information provided to the prediction system 100 by the user devices 140 may include device data (e.g., battery health, network connectivity speed, geographic location, etc.), user engagement data (e.g., screentime, keylogger information, login and logout times, shutdown and start up times, etc.), and other raw data input to the user devices 140.

The databases 150 store information related to the system 10 and the processes described herein. For example, the databases 150 can store organizational strategy information, change logs, change triggers, digital calendars, communications, activity reports, direct engagement information, digital artifacts (e.g., email messages, calendar appointments, documents, text messages, reports, etc.), conversation data, assessment data, assignment data, user and/or user profiles, data on content explored by users and/or users and/or similar information. The databases 140 can be any device or service configured to store signals, information, and/or data (e.g., hard-drive, server, cloud storage service, etc.). The databases 140 can receive and store signals, information and/or data from the other components (e.g., the primary compute device 130, the secondary compute device 140, the conversation model 160, the prediction system 100, etc.) of the system 10. The databases 140 can include a local storage system associated with the prediction system 100, such as a server, a hard-drive, or the like or a cloud-based storage system. In some implementations, the databases 140 can include a combination of local storage systems and cloud-based storage systems. In some implementations, the databases 140 include different databases for storing different information. For example, the databases 150 can include a database for storing information used to determine an action plan and a database for storing information used to determine an answer prediction and a skill prediction. In some implementations, the databases can include information associated with multiple entities and/or the admin U1.

The system 10 further includes a conversational artificial intelligence (AI) model, shown as a conversation model 160. The conversation model 160 can receive inputs from and provide outputs to one or more users or users. The conversation model 160 can be used as a chatbot by the users U to aid in their learning of particular topics. The conversation model 160 can record and save chat information (e.g., from conversations with the user) in the databases 150.

In some implementations, the conversation model 160 can provide prompts to one or more users or users to obtain information (e.g., user information, user information, knowledge information) and can use the one or more inputs to update a knowledge graph, train a model (e.g., the answer prediction model 114, the skill prediction model 116, the remediation model 118) or as input to a model to generate predictions. In some implementations, the conversation model 160 ranks subject matter areas (e.g., math, science, history, geography) based on the inputs (e.g., queries, conversational queries), and an output from the conversation model 160 may include and/or be associated with a priority ranking of the subject matter for the student or user, or the priority ranking can be provided to the remedial model 118 to further inform the generation of an action plan. The conversation model 160 can, based on the ranking, generate a strategy vector that can be improved and/or optimized to maximize and/or increase the action plan.

The prediction system 100 is configured to receive inputs (e.g., raw data, queries, relationship information, etc.) to generate a graph (e.g., knowledge graph, semantic network, etc.) concerning the relationship between behavior (e.g., user behavior, inputs from the user device 140) and performance (e.g., academic performance), as discussed further herein. For example, the graph may indicate a linear relationship between a first user behavior (e.g., answering 18 out of 20 questions correct relating to differential equations) and a future academic performance (e.g., users with high accuracy for differential equations will likely do well on questions related to control systems). As such, the graph can be used to indicate relationships between concepts, subjects, questions and/or the like (e.g., as prerequisites or indicators of success for other topics). In some implementations the graph can be generated by a machine learning model. In some implementations, the graph can at least partially be curated by an expert. In some implementations, each node of the graph can be a subject, concept, question, trait, past performance and/or the like and each edge in the graph can represent a relationship between each node. In some implementations, the shorter the edge, the closer the relationship between the nodes.

The prediction system 100 is further configured to seed, prime, train and/or pre-train a model (e.g., answer prediction model 114, skill prediction model 116 and/or remediation model 118) with the graph. In some implementations, the prediction system 100 creates a knowledge graph based on the received inputs, such as user engagement information with the user devices 140. In some implementations, the knowledge graph is based on (e.g., structured around, etc.) other knowledge graphs. For example, knowledge graph may be based on other knowledge graphs previously created by the prediction system 100 and based on knowledge graphs received from other sources (e.g., knowledge graphs of users in other cities, knowledge graphs of users learning similar topics, etc.).

The prediction system 100 is further configured to use the knowledge graph to pre-train (e.g., fit) a model (e.g., the parameters of a model). In some embodiments, the model (e.g., answer prediction model 114, skill prediction model 116 and/or remediation model 118) is seeded, primed, trained and/or pre-trained using multiple knowledge graphs, such as a first knowledge graph and a second knowledge graph. In some embodiments, the model is seeded, primed, trained and/or pre-trained using self-generated knowledge graphs and knowledge graphs collected from sources outside the system 10 via the network (e.g., found on the internet, specific to educational rubrics, etc.). Seeding, priming, training and/or pretraining the model using the knowledge graph can aid the model in properly and effectively identifying connections and/or relationships between success and/or failure across subjects, concepts, topics and/or the like. This ensures that the answer prediction model 114 and/or the skill prediction model 116 do not define connections between concepts, subjects and/or questions that actually do not have relationships.

The prediction system 100 is further configured to receive a query (e.g., command, question, etc.) from a user (e.g., admin U1, user U, etc.) and output a prediction associated with a specific context. For example, admin U1 can use an input device to send the query "is User X likely to answer question Y correctly?" where User X is associated with one of the user devices 140 and question Y is provided to the prediction system 100 prior to the generation of the query.

The prediction system 100 is configured to generate an answer prediction, such as "yes" or "no." In some implementations, where the query is "how likely is User X to get question Y correct?" the prediction system 100 is configured to generate either a quantitative answer prediction (e.g., 78 percent likelihood of answering question Y correctly) or a qualitative answer prediction (e.g., user X is not very likely to answer question Y correctly). In some implementations, the query includes a request to predict User X's performance on more than one question. In some implementations, the prediction system 100 updates the model in response to receiving the query and/or after generating the answer prediction.

The prediction system 100 is further configured to generate a skill prediction in response to receiving a request for a skill prediction. For example, the admin device 130 may provide the query "how well does User X understand covalent bonding?" The prediction system 100 is configured to generate either a qualitative or quantitative skill prediction based on the model. In some implementations, the prediction system 100 updates the model in response to receiving the query and/or after generating the skill prediction.

The prediction system 100 includes a processor 102 and a memory 104, each operatively coupled to one another (e.g., via a system bus). The prediction system 100 is in communication with (e.g., communicatively coupled to) the admin device 130, the user device 140, the database 150, and the conversation model 160 via the network 120. The prediction system 100 is configured to send information to and receive information from any of the admin device 130, the user device 140, the database 150, and the conversation model 160. In some embodiments, the prediction system 100 is integrated within one of the admin device 130 or the user device 140.

The processor 102 may be a hardware-based integrated circuit (IC) or any other suitable processing device configured to run and/or execute a set of instructions or code. In some implementations, the processor 102 is a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 is operatively coupled to and in communication with the memory 104 and the network 120, such as through a system bus (e.g., address bus, data bus, control bus, etc.) and/or a wireless connection.

The memory 104 of the of the prediction system 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device. For example, a remote database device can serve as a memory and be operatively coupled to the compute device.

The memory 104 includes and/or stores a data extractor 106, a preprocessor 108, a query processor 110, a data synthesizer 112, an answer prediction model 114, a skill prediction model 116, and a remediation model 118. In some implementations, the data extractor 106, the preprocessor 108, the query processor 110, the data synthesizer 112, the answer prediction model 114, the skill prediction model 116, and the remediation model 118 can be software stored in memory and executed by processor 102. In some implementations, the data extractor 106, the preprocessor 108, the query processor 110, the data synthesizer 112, the answer prediction model 114, the skill prediction model 116, and the remediation model 118 can be implemented in hardware at the prediction system 100.

In some implementations, the admin device 130 is associated with a admin U1 of an entity (e.g., school, university, commercial tutoring entity, etc.), and the prediction system 100 is associated with the entity. In some implementations, the admin device 130 is associated with a first organization, and the prediction system 100 is associated with a second organization different from the first organization. For example, the first organization may be an educational institution (e.g., elementary school, middle school, high school, college, university, etc.) and the second organization may be an educational consulting group, tutoring service, or the like.

The prediction system 100 receives user information from the admin device 130 via the network 120. User information includes admin device information (e.g., battery life, geographic location, device type, etc.), a user profile (e.g., demographic information, age, gender, sex, education level, credentials, etc.), chatbot conversations (e.g., semantic data sent between the admin device 130 and the conversation model 160), input device information (e.g., engagement history with the input 138), explored content (e.g., browsing history), and user device conversations (e.g., semantic data transmitted between the admin device 130 and the user device 140).

The prediction system 100 is further configured to receive user information from the user devices 140 via the network 120. User information includes user device information (e.g., battery life, geographic location, device type, etc.), a user profile (e.g., demographic information, age, gender, sex, grade level, education level, parent's education level, etc.), chatbot conversations (e.g., semantic data sent between the user device 130 and the conversation model 160), input device information (e.g., engagement history with the input device of the user device 140), explored content (e.g., browsing history), user device conversations (e.g., semantic data transmitted between the user device 140 and the admin device 130), and assessment data (e.g., answers to exams, essays, practice problems, and the like)

The prediction system 100 is further configured to receive knowledge information from the database(s) 150. Knowledge information is information that the memory 104 uses to generate the graph for training the model(s) (e.g., answer prediction model 114, skill prediction model 116 and/or remediation model 118). Knowledge information can include data from sources other than the user device 140 and the admin device 130, such as academic papers, scientific journals, and the like. For example, knowledge information may include a peer-reviewed list containing quantified relationships between various academic subjects (e.g., a correlation matrix that compares how academic performance in a first subject is correlated to academic performance in a second subject). Knowledge information can include, in part, user information and user information.

Conversation information is information created by the conversation model 160. For example, the conversation model 160 may be a chatbot powered by artificial intelligence and configured to provide outputs (e.g., plain language outputs, semantic outputs, code, math equations, etc.) in response to inputs (e.g., plain language inputs, semantic inputs, audio inputs, code, math equations, etc.). In some instances, conversation information is mutually exclusive from both the user information and the user information. For example, the conversation information may include inputs provided to and outputs provided by the conversation model 160 originating outside of the system 10. In some implementations, the conversation model 160 can be any suitable machine learning model such as, for example, a large language model (LLM), a neural network, a decision tree, a reinforcement learning model and/or the like. In some implementations, the conversation model 160 is internal to the system 10, such that the conversation information includes inputs received from and outputs provided to the user device 140 and the admin device 130.

In some implementations, the prediction system 100 automatically receives user information, user information, knowledge information, conversation information, and user interaction data (e.g., question data, engagement data, etc.). In some implementations, the prediction system 100 sends a request (e.g., on-display prompt, access request, etc.) to receive user information, user information, knowledge information, and conversation information.

In some implementations, the prediction system 100 continuously, periodically, or sporadically monitors the admin device 130, the user devices 140, the database(s) 150, and/or the conversation model 160 for changes in (e.g., additions to, subtractions from) user information, user information, knowledge information, and conversation information. In some implementations, the prediction system 100 normalizes user information, user information, knowledge information, and conversation information into a standard format. In some implementations, the prediction system 100 generates the knowledge information and conversation information based on raw data collected from the admin device 130, the user devices 140, database(s) 150 and/or the conversation model 160.

The data extractor 106 is operatively coupled to the preprocessor 108, the query processor 110, the data synthesizer 112, the answer prediction model 114, the skill prediction model 116, and the remediation model 118. The data extractor 106 may include a natural language processing machine learning model. The data extractor 106 may be used to analyze essays, short answer responses, queries, and other student and user interactions with the prediction system 100.

In such embodiments where the data extractor 106 includes a natural language processing machine learning model, the data extractor 106 identifies a context associated each term from an input (e.g., user input, user input, query, etc.) from a plurality of terms in the input. In some implementations, the data extractor 106 includes any suitable type of machine learning algorithm.

The data extractor 106 extracts relevant data from the information received by the prediction system 100 (e.g., the user information, the user information, the knowledge information, and the conversation information). The data extractor 106 may also extract relevant data from the database 150 via the network 120. The data extractor 106 can extract relevant data from the information regardless of the interaction types included in the data. Relevant data may include interaction types such as, for example, chatbot conversations, explored content (e.g., browsing history, pages visited, interaction history, etc.), assessments (e.g., performance on practice problems), user profiles (e.g., name, age, education level, associated educational entity, etc.) and the like from the user devices 140 and/or the admin device 130. For example, relevant data may include which study aids the user is using, how many different study aids the user is using at the same time, how long the user is spending with each study aid, and so on. Relevant data may also include assessment performance, such as whether the user is getting questions right or wrong, how long the user is taking to answer each question, how many words the user types for a short answer or essay question, how often the user is skipping questions, how often the user is changing their answer to a question, and so on. The relevant data may include other data related to use of the user device, such as location of the device, login and logout times, volume settings, keylogger information, ambient noise captured through the microphones, video information captured from a camera (e.g., eye contact with and away from the screen), information captured from other sensors on the user device 140 (lidar, light, infrared, thermal, other 3D sensors, etc.), network connectivity speed and reliability, battery percentage, and so on. In some implementations, the data extractor 106 stores the extracted data in the databases 150.

The preprocessor 108 receives the extracted data from the data extractor 106 and organizes the extracted data based on relevance for a particular application. In embodiments where the prediction system 100 is outputting a skill prediction, the preprocessor 108 may determine that certain extracted data has more relevance than other extracted data. For example, the preprocessor 108 may determine, either based on instructions or based on a knowledge graph, that geographic location, time of day, device battery life, and data gathered from 3D sensors is irrelevant for generating the skill prediction. The preprocessor 108 may further determine that question performance, time per question, and frequency of skipping questions are highly correlated to the skill prediction and should be considered when calculating the skill prediction. The preprocessor 108 may further determine that eye contact, scrolling distance, and frequency of changing answers have medium relevancy when weighed against the other extracted data. The preprocessor 108 may update the relevancy of the extracted data (or categories of extracted data) as the prediction system 100 is in continued use, lowering the relevance of some extracted data while raising the relevance of other extracted data. The preprocessor 108 may adjust these relevancy weights in response to a relevancy model trained on a knowledge graph. As the preprocessor 108 adjusts the relevancy weights of the extracted data, the preprocessor 108 may create or contribute to a knowledge graph that is used to train other portions of the prediction system 100, such as the data synthesizer 112, the answer prediction model 114, the skill prediction model 116, and/or the remediation model 118.

In some implementations, the preprocessor 108 can include a machine learning model (e.g., natural language processing model, etc.) to generate or update the knowledge graph. The preprocessor 108 is configured to generate a vector representation (e.g., using a transformer, discussed herein) of the extracted data and/or the information associated with the query on the knowledge graph. The vector representation is used to preserve context between data on the graph by providing similarity measures between data by providing similarity measures between the vectors (e.g., cosine similarity, as discussed herein). In some implementations, the vector representations are generated based on semantic similarities of subsets of the data regardless of the type of data. For example, the vector representations can indicate a stronger relevancy between two questions in a same topic than between a question in a first topic and a question in a second topic. In some embodiments, the vector representations can be used to generate and/or update a knowledge graph.

In some implementations, the knowledge graph can be generated and/or updated using a transformer initially trained at least partially on a corpus of general text. In some implementations, the training of this transformer is augmented based on organization specific, context specific, etc. information. For example, augmenting the training can include augmenting the training based on a specific topic (e.g., science, technology, engineering, math, education, etc.).

In some implementations, this transformer can generate the vector representations (e.g., numerical vectors, embeddings, etc.) based on a plan (e.g., lesson plan). The numerical vectors can include vectors for each unit (e.g., question, concept, etc.) of the plan. In some implementations, the vector for each unit can be used as input to a cosine similarity algorithm and/or model to measure the similarity between the vectors. In some implementations, the results of the cosine similarity algorithm and/or model can be filtered. For example, results of the cosine similarity algorithm and/or model that are below an empirically derived threshold can be reduced to zero, thus providing a bi-partite/bilateral graph of relations between the vectors as well as weights indicating the strength of relationships. This provides an indication of how a specific unit (e.g., question, concept, etc.) is related to the remaining units and/or broader clusters of units.

In some implementations, the results of the cosine similarity algorithm and/or model can be adjacency matrices and/or graphs (e.g., the bi-partite/bilateral graph of relations between vectors). In some implementations, numerical vector representations can be assigned to each graph and/or adjacency matrix to define graph embeddings. In some implementations, such numerical vector representations can be assigned using a separately trained machine learning model (e.g., neural network, etc.).

In some implementations, the graph embeddings can be used to represent each question when training the answer prediction model 114 and/or the skill prediction model 116, as described herein. Similarly stated, in some implementations, the graph embeddings can be used to generate and/or update the knowledge graphs used to train the answer prediction model 114 and/or the skill prediction model 116. The knowledge graphs can then be used to update and/or train the answer prediction model 114 and/or the skill prediction model 116, thus allowing the answer prediction model 114 and/or the skill prediction model 116 to be trained on information that is associated with how data (e.g., questions, concepts, etc.) is related to other data and how performance can be extrapolated from the data relation. Specifically, the graph embeddings contain information about how each question is related to various concepts, and thus also include information on how the questions and/or concepts are related to each other. This allows the answer prediction model 114 and/or the skill prediction model 116 to be trained to extrapolate performance on one question to predicted performance on other questions.

The query processor 110 receives a query, interprets the query, and transfers the interpreted query to the data synthesizer 112. The query processor 110 may receive the query from the admin device 130, a user device 140, the conversation model 160, or another compute device communicably coupled to the prediction system 100 via the network 120. The query received by the query processor 110 may be highly specific, providing instructions to the prediction system 100 on which extracted data is most relevant and how much weight to assign to certain data. A query can be "how quickly is User X progressing in organic chemistry since August 8, including only User X's performance on multiple choice quizzes that follow video tutorials." Such a query limits the subject matter of the data, the time frame of when the data was collected, and is limited to a certain question type. Other queries may be vague such that the query processor 110 can prompt the query provider (e.g., user, user) to provide more information.

In some implementations, the query processor 110 receives a plain language query requesting information about a user's future performance on an exam ("how will User X perform on exam Y?") or a user's predicted understanding of a subject ("how well does User X understand concept Y?"). The query processor 110 is further configured to interpret queries pertaining to multiple users ("how will class X do on exam Y?"; "how well does class X understand concept Y?"; "which user in class X will need the most assistance in understanding concept Y?"; etc.). The query processor 110 translates the query into instructions that are readable by the data synthesizer 112. In some implementations, the query processor 110 may, in response to receiving a first query, prompt the query provider (e.g., the admin device 130, a user device 140, the conversation model 160) for a second query to further clarify the first query. For example, the query processor 110 may prompt the query provider to provide a location (e.g., file location, cloud location, internet link, etc.) to "exam Y," or the query processor 110 may prompt the query provider to further clarify who "user X" is, such as when multiple users have the same name, or where student X is not present in the database 150 (e.g., misspellings, first time enrollment in the prediction system 100, etc.).

In some implementations, the query processor 110 receives a plain language query requesting information about a student's present performance. For example, the query processor 110 may receive a query of "how is User X doing in math?" The query processor 110 may then prompt the query provider to provide more information, asking "which topic within math are you interested in?" or "how would you like their progress presented?" The query provider may then provide a second query or click on a presented option from an interface feature presented by the query processor 110 to the query provider (e.g., press "as a line graph" or "as a short summery" as an answer to "how would you like their progress presented?").

The query processor 110 is configured to generate a processed query, readable by the data synthesizer 112. Creation of the processed query may involve receipt of multiple queries from the query provider, presentation of multiple clarifying prompts to the query provider, and receipt of responses to those clarifying prompts. The conversation between the query processor 110 and the query provider can be called a query event, and one or more processed queries may be generated per query event.

The data synthesizer 112 is operatively coupled to the processor 102. The data synthesizer 112 is configured to receive the preprocessed data (e.g., weighted data) from the preprocessor 108 and receive the processed query from the query processor 110. The data synthesizer 112 condenses the preprocessed data based on the processed query. For example, where the processed query includes a date range, the data synthesizer 112 can gather the preprocessed data from within that date range and transfer the preprocessed data to the answer prediction model 114, the skill prediction model 116, and/or the remediation model 118. In some embodiments, where the processed query includes a trigger for a particular subject matter (e.g., mathematics, history, spelling, etc.), the data synthesizer can filter the preprocessed data, extract the data relevant to the subject matter in the processed query, and provide the relevant data to the answer prediction model 114. The data synthesizer 112 may further interpolate the processed query to create instructions for the answer prediction model 114.

The answer prediction model 114 is a first model configured to generate a first answer to a processed query (e.g., processed answer query) received from the query processor 110. The answer prediction model 114 may be a large language model (LLM), an auto regressive transformer model, a machine learning model, a neural network model, a generative artificial intelligence (AI) model, a reinforcement learning model, a decision tree model, a random forest model (e.g., random decision forest), and/or the like. The answer prediction model 114 may be trained using knowledge graphs, connections between subjects, contexts and concepts, connections between behavior and academic performance, and/or data from the database(s) 150, conversation model 160, admin device 130, and user device 140. In some instances, the answer prediction model 114 is trained using a knowledge graph, such as an answer knowledge graph, similar to the knowledge graphs discussed herein. In some implementations, each node of the answer knowledge graph can be a subject, concept, question, trait, past performance, context and/or the like and each edge in the graph can represent a relationship between each node. In some implementations, the shorter the edge, the closer the relationship between the nodes. Thus, the answer knowledge graph can indicate a relationship between such subjects, concepts, questions, traits, past performance, context and/or the like. This helps ensure that predictions are made based on established relationships.

Moreover, in some implementations, the answer knowledge graph may include relationship data between types of user information (e.g., user data, location, past performance, etc.) and future performance. In some implementations, each node of the graph can be a user trait (e.g., physical location, hobbies and interests, years of education, parent's education level) and an academic subject, and each edge of the graph can represent a relationship between each node (e.g., users who play ice hockey may generally perform better in science subjects but perform worse in language courses).

In some instances, the answer knowledge graph includes relationship data between different subjects (e.g., users who perform well in mathematics may perform well in computer science courses, but perform below average in history classes.). In some instances, the knowledge graph includes relationship data between individual questions, where each node is a particular question, and each edge of the graph is the relationship of that question to other questions (e.g., users who answer question A correctly are 40% likely to answer question B correctly, 53% likely to answer question C correctly, and 90% likely to answer question D correctly).

The answer prediction model 114 receives the processed query and the filtered preprocessed data from the data synthesizer 112. The answer prediction model 114 then generates a first answer prediction based on the filtered preprocessed data according to the processed query. In instances where the processed query received by the query processor 110 is a request for a first user's predicted answer to a first question, the answer prediction model 114 generates and/or identifies a first answer prediction based on the synthesized data received from the data synthesizer 112. In some implementations, the answer prediction model 114 is configured to generate and/or identify a first question on (e.g., relating to) a first subject and then generate a first answer prediction to the first generated question. In some implementations, the answer prediction model 114 generates a first answer prediction for a question pulled from a question bank or provided to the prediction system 100 via the network 120.

In some implementations, the answer prediction model 114 includes a transformer. In some implementations, the transformer can be an auto regressive transformer model. The transformer, as described above, is configured to receive data (e.g., previous answers, a query, target question, etc.) from the data synthesizer 112 and generate an answer prediction for one or more question (e.g., target question, etc.). In some embodiments, the output of the transformer is a probability of a user answering the target question desirably. In some embodiments, the transformer can receive the vector representations generated by the preprocessor 108 to generate the answer prediction. For example, the vector representations can be used to further train the transformer (e.g., as part of a knowledge graph, discussed herein). The vector representations improve the transformer outcome by providing greater context between the data and the target question.

In some implementations, the transformer is trained on the knowledge graph. In some implementations, the transformer can be retrained or updated based on changes and/or updates to the knowledge graph. In some implementations, the transformer can be retrained automatically based on the knowledge graph being updated. The first answer prediction may be binary, non-binary, quantitative, qualitative, and/or explanatory. In instances where the first answer prediction is a binary answer prediction, the answer prediction model 114 can predict whether the first user will get the first question "right" or "wrong." Example questions where a binary answer prediction may be applicable are for true/false questions, multiple choice questions, short answer questions, numeric response questions, matching questions, and fill-in-the-blank questions.

In instances where the first answer prediction is a non-binary answer prediction, the answer prediction model 114 can predict which answer the user is likely to choose for questions with a finite number of answer choices. In some embodiments, the answer prediction model 114 can assign a likelihood (e.g., percentage) that that the first user will select each of the answer choices. Example questions where a non-binary answer prediction may be applicable include multiple choice questions, true/false questions, fill-in-the-blank questions, and matching questions. The non-binary answer prediction may be based on the user information, the user information, the knowledge information, and the conversation information.

In instances where the first answer prediction is a quantitative answer prediction, the answer prediction model 114 can predict a numerical answer at which the user is likely to arrive. For example, where the first question is "calculate the capacitance of capacitor A in the provided circuit diagram," the answer prediction model 114 can determine the most probable numerical answer that the first user will arrive at. For example, if the user typically forgets to include power loss through the wires in her calculations, then the answer prediction model 114 can predict the numerical answer that omits power loss from the equation.

In instances where the first answer prediction is a qualitative answer prediction, the answer prediction model 114 can predict a likely non-numerical answer response from the first user to the first question. Example questions where a qualitative answer prediction may be applicable include essay questions, short response questions, fill-in-the-blank questions, and audio response questions. The qualitative answer prediction may be provided for questions where there is no finite or limited amount of answer choices.

In some implementations, an explanatory answer prediction is associated with any one of the binary, non-binary, quantitative, and qualitative answer predictions. The explanatory answer prediction includes an explanation from the answer prediction model 114 of why the answer prediction model 114 predicted what it predicted. For example, the first question may be "what is the capital of New York?" including four answer options, one of which being Albany. The answer prediction model 114 may predict that the first user will get the answer wrong (binary), that the user will pick "Buffalo" instead of Albany (non-binary), and/or that the first user has a 13% chance of picking Albany (quantitative). The answer prediction model 114 may then provide an explanatory answer prediction for why the answer prediction model 114 believes the first user will answer the first question incorrectly. The answer prediction model 114 may consider the user information in arriving at the first answer prediction. For example, for geography questions, the answer prediction model 114 may determine that a greater distance between the location of the first user and the subject of the first question leads to a decrease in answering geography questions correctly. Thus, an explanatory answer prediction may recite "First User has a 13% chance of choosing Albany since First User lives in Utah and First User has not been presented with educational materials related to the capital of New York." Likewise, where the first user is from New York, the answer prediction model 114 may estimate a higher probability of getting the first question right, based on information from the database 150 that suggests that users who live in a state generally know the capital of that state.

The first answer prediction and the accompanying explanatory answer prediction are stored in the memory 104 and used to further train the answer prediction model 114 and the skill prediction model 116. In some embodiments, the first answer prediction and the accompanying explanatory prediction are stored in the database 150. In some embodiments, the admin UI of the admin device 130 may provide an initial accuracy report for the first answer prediction and the accompanying explanatory answer prediction, indicating a belief that the first answer prediction and/or the accompanying explanatory answer prediction are accurate or inaccurate. For example, where the admin U1 knows that the user has been spending time learning about state capitals through learning methods outside of use of the user device 140, the admin U1 may rank the accuracy of the first answer prediction as low and optionally prevent the first answer prediction from being stored and/or being added to a knowledge tree and/or being used to train a model (e.g., the answer prediction model 114, the skill prediction model 116, etc.). In some embodiments, the first answer prediction and the explanatory answer prediction are stored and not used for training either of the answer prediction model 114 or the skill prediction model 116.

In some embodiments, the first answer prediction is stored and checked at a later time for accuracy, such as after the user is presented with the first question for the first time. After the first answer prediction has been verified against an actual performance by the user, the data extractor 106 can provide that data to the preprocessor 108 for the purposes of adding to a knowledge graph, updating a knowledge graph, retraining and/or training the knowledge graph (as discussed herein) and pre-training and/or fitting the updated knowledge graph to one of or both of the answer prediction model 114 and the skill prediction model 116. In some implementations, the data can be used to retrain the answer prediction model 114 and/or the skill prediction model 116.

The skill prediction model 116 is a second model configured to generate a second answer to a processed query (e.g., processed skill query) received from the query processor 110. The skill prediction model 114 may be a large language model (LLM), a machine learning model, a neural network model, a generative artificial intelligence (AI) model, a reinforcement learning model, a decision tree model, a random forest model (e.g., random decision forest), and/or the like. The skill prediction model 114 may be trained using knowledge graphs, connections between subjects and concepts, connections between behavior and academic performance, and data from the database 150, conversation model 160, admin device 130, and user device 140. In some instances, the skill prediction model 116 is trained using a knowledge graph, such as a skill knowledge graph, similar to the knowledge graphs discussed herein. In some instances, the skill knowledge graph includes relationship data between different subjects and/or concepts (e.g., users who perform well in mathematics may perform well in computer science courses, but perform below average in history classes). In some instances, the skill knowledge graph includes relationship data between individual questions, where each node is a particular question, and each edge of the graph is the relationship of that question to other questions (e.g., users who answer question A correctly are 40% likely to answer question B correctly, 53% likely to answer question C correctly, and 90% likely to answer question D correctly).

The skill prediction model 116 can receive the processed query from the query processor 110, the filtered preprocessed data from the data synthesizer 112, and the first answer prediction from the answer prediction model 114. Based on the processed query, the filtered preprocessed data, and the first answer prediction, the skill prediction model 116 generates a first skill prediction (e.g., the second answer). In some implementations, the first answer prediction generated by the answer prediction model 114 is stored, such as in the database(s) 150, and then later included in the filtered preprocessed data provided to the skill prediction model 116 in response to a query received by the query processor 110. In some implementations, the skill prediction model 116 synthesizes multiple answer predictions from the answer prediction model 114 into a single skill prediction. In some instances, the answer predictions and skill prediction are associated with an overall strategy for the first user, such as a progress report, learning plan, remedial learning plan, engagement plan, and/or the like.

In some implementations, the skill prediction model 116 is continuously, sporadically and/or periodically trained during operation of the prediction system 100. For example, the skill prediction model 116 may receive feedback associated with a first skill prediction, such as a future performance by a first user associated with the skill prediction. In other words, the skill prediction model 116 may predict User X's competency for the subject "unit circles" before User X has begun her unit on unit circles. User X's skill prediction may include both a "current skill prediction" (how well she understands the material right now), and a "projected skill prediction" (estimating her ability to learn the material throughout the unit and a final competency score). At the end of the unit, after User X has completed her learning on the user device 130, the skill prediction model 116 can compare the "projected skill prediction" to User X's actual performance and retrain the skill prediction model 116 based on the delta between User X's actual performance and User X's "projected skill prediction.

The remediation model 118 is a third model configured to generate a third answer to a processed query (e.g., processed skill query) received from the query processor 110. The remediation model 116 may be a large language model (LLM), a machine learning model, a neural network model, a generative artificial intelligence (AI) model, a reinforcement learning model, a decision tree model, a random forest model (e.g., random decision forest), and/or the like. The remediation model 116 may be trained using knowledge graphs, connections between subjects and concepts, connections between behavior and academic performance, and data from the database(s) 150, conversation model 160, admin device 130, and user device 140. In some instances, the remediation model 118 is trained using a knowledge graph, such as a remediation knowledge graph, similar to the knowledge graphs described herein. In some instances, the remediation knowledge graph includes relationship data between behavior (e.g., reading an article, clicking on a link, watching a video, etc.), different subjects (e.g., math, science), and academic performance. For example, the remediation knowledge graph may indicate that users perform better on multiple choice questions related to American history after watching a video on a subject rather than reading an excerpt from a textbook. The remediation knowledge graph may also show a relationship between time spent studying (e.g., interacting with a user device 140) and performance, indicating that after so many(e.g., too many) hours, the benefits of studying decrease. In other words, the edge of the remediation knowledge graph may connect nodes based on the "sweet spot" for time spent studying (e.g., users who watch math tutorial videos can improve their understanding of the American Constitution by completing 35 practice problem in between 1-2 hours).

The remediation model 118 can receive the processed query from the query processor 110, the filtered preprocessed data from the data synthesizer 112, the first answer prediction from the answer prediction model 114, and the skill prediction from the skill prediction model 116. Based on the processed query, the filtered preprocessed data, the first answer prediction, and the first skill prediction, the remediation model 118 generates a first action plan (e.g., user action plan, user action plan, next steps, etc.) for either the admin U1 or the user based on one of or both of the first answer prediction and the first skill prediction. For example, the action plan can include suggested readings, videos, audio recordings, tutorials, practice questions, practice exams, studying schedule, tutors, tutoring schedule, and the like. In some embodiments, such as where the user information includes login times, location information, and ambient noise data, the remediation model 118 can generate an action plan including a sleep schedule, study schedule, suggested study locations, information on those suggested study locations (e.g., hours of operation, average noise levels, internet connection speeds, accessibility, etc.), tutors in the area, and environmental recommendations (e.g., "User A studies best in environments with moderate noise levels, such as coffee shops and building lobbies.").

The action plan generated by the remediation model 118 can consider efficiency, cost, time, effort, likelihood of success, and so on. The remediation model 118 can generate individual user action plans, individual user action plans, and organizational action plans that consider the effects that the action plan will have on each user, user, and/or the organization. For example, upon determining that a user is grasping concepts at a pace much quicker than the other users, the remediation model 118 may determine that the user U should be removed from the rest of the users and moved to a different class (e.g., a more advanced class, a class focusing on a different topic). This way, the remediation model 118 can consider the effects of a gifted or advanced user on the other users, the user, and/or the organization. By removing the advanced user from the rest of the users, the remediation model 118 may be balancing the user's attention and focus, the moral of the class, and the interests of the advanced user. Based on the knowledge graph formed by the collection of data from the data extractor 106, the remediation model 118 may determine that an advanced user cannot be given the attention she needs in a class where most of the users are learning at a slower pace, and thus monopolizing the user's time and attention.

The action plan (e.g., user action plan, user action plan, organization action plan) can be based on the strengths of the admin U1, an availability of the admin U1, a location of a admin U1, relationships of the admin U1, strengths of the user, an availability of the user, a location of the user, relationships of the user, the financial means of the user, strengths of the organization, a location of the organization, and/or the resources available to the organization.

In some implementations, the remediation model 118 receives triggers indicating a change in the user information (e.g., location, age, competence, etc.), a change in user information (e.g., obtaining a degree or certificate, availability, location, etc.), a change in knowledge information (e.g., research suggesting that user performance in one subject matter correlates to a certain level of competency in a second subject matter, where this correlation was not previously known to the prediction system 100, etc.), and/or a change in conversation information (additional conversations with the conversation model 160, etc.). Such triggers can be used to retrain the answer prediction model 114, retrain the skill prediction model 116, and retrain the remediation model 118. In some embodiments, the triggers can be used to update the knowledge graph.

In some embodiments, the remediation model 118 provides a list of tasks and/or a schedule the users U or the admin U1 should complete. For another example, the action plan can be a plan indicating a percentage of time and/or effort each of the users U or admin U1 should spend on certain activities and/or focus areas. For example, a user action plan can instruct a user to spend 50% of their time and/or effort on a first focus area, 20% of their time and/or effort on a second focus area, 20% of their time and/or effort on a third focus area, and 30% of their time and/or effort on a fourth focus area. In some implementations, for example, the remediation model 118 uses descriptions and/or labels associated with individual activities, events, and/or other allocations of resources and then maps each allocation to a corresponding focus area. In some implementations, a focus area can, for example, correspond to practice exams, dedicated time interacting with a virtual tutor, video tutorials, and the like.

After the remediation model 118 provides an action plan, monitoring compliance with the action plan and collecting interaction data related to the action plan may be a task delegated to a separate system within the prediction system 100 or external to the prediction system 100. When the action plan is followed, the prediction system 100 can track whether there is measurable improvement in performance and use that data to further train the models (the answer prediction model 114, the skill prediction model 116, and the remediation model 118). In some instances, the prediction system 100 continuously, sporadically and/or periodically updates the action plan in response to detecting that the action plan is being followed, but that there is no measurable improvement. For example, the prediction system 100 may determine that the user U or the admin U1 is spending a sufficient amount of time on the material, but that the user U/admin U1 is still struggling. In such an instance, the remediation model 118 may be retrained and update the action plan to adjust the types of materials that the user U/admin U1 is spending time on. For example, the prediction system 100 may detect that the user U is spending a lot of time on video tutorials without making much progress. Thus, the remediation model 118 may update the action plan to suggest more individualized tutoring, more time interacting with the conversation model 160, and/or more time reading materials instead of watching videos.

Where the action plan is generated for a admin U1 who is a teacher, professor, tutor, or the like, the action plan can include suggestions for what to teach to better prepare the class or a user U for an upcoming exam or to help the class/user U better understand a concept in which it/he is struggling. For example, if the admin U1 has been instructing the class by pushing practice problems to the user devices 140, the action plan may recommend that the admin U1 instead spend individual time with Users L, M, and P, as they are struggling the most, while allowing the remainder of the class to watch certain videos or complete self-guided tutorials. In some instances, the action plan may recommend that the class be split in two or more groups based on how fast the users U are grasping the concepts.

Figure 2:
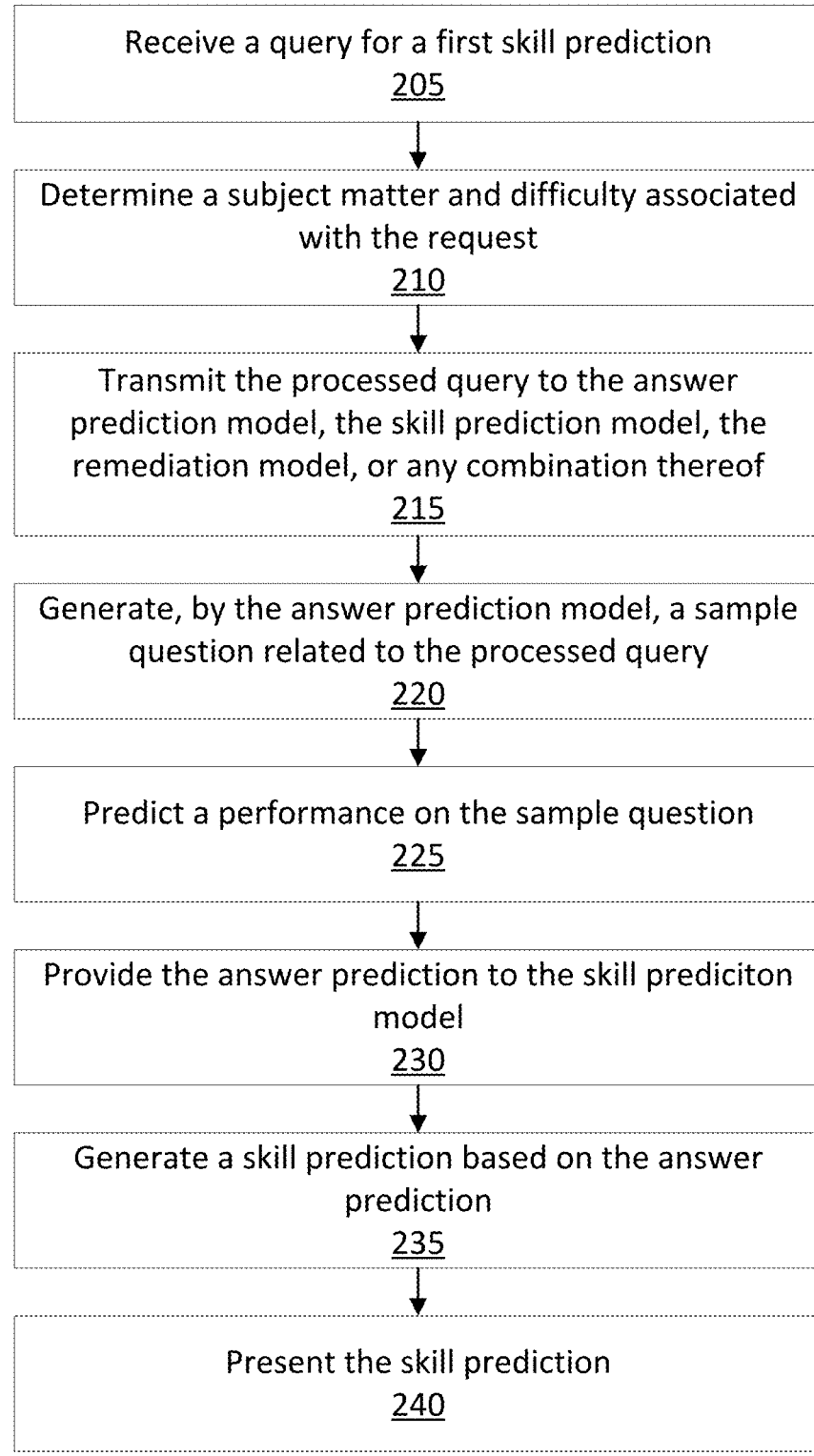
FIG. 2 shows a flowchart for a method for predicting future performance with the system of FIG. 1.

Turning now to FIG. 2, a method 200 of generating a skill prediction by the prediction system 100 of FIG. 1 is shown, according to an example embodiment.

At 205, the prediction system 100 (e.g., the processor 102) receives a request for a first skill prediction. The request may be in the form of a query received by query processor 110 and provided, as a processed query, to the skill prediction model 116. The processed query includes a request for a first skill prediction. The request may be received as a query from one of the admin device 130, the user devices 140, the conversation model 160, or a separate computing device in communication with the prediction system 100 via the network 120. The query is interpreted by the query processor 110, which translates the query into instructions that are executable by the answer prediction model 114, the skill prediction model 116, and the remediation model 118.

For example, the query may be a plain language query, such as "how well is User X likely to perform in music theory?" or "how well is class X going to do in music theory?" In both instances, the query is a request for a skill prediction, estimating User X's or class X's competence in a particular subject matter without concern for how well User X or class X does on any particular exam or question.

At 210, the query processor 110 (executed by processor 102) determines a subject matter and a difficulty associated with the query. For example, where the query is "how well is User X likely to perform in music theory?" the query processor 110 can determine that the relevant subject matter is "music theory." Determining the difficulty of the subject matter associated with the query may depend on the user information (e.g., User X's age, previous music experience, year in school, etc.) and/or the user information (e.g., the query provider's curriculum from past years, etc.).

Where the query processor 110 is unable to determine the difficulty level with reasonable certainty, the query processor 110 may prompt the query provider to provide clarifying information, such as "in what music theory class is User X enrolled?"

At 215, after the query processor 110 determines the subject matter and the difficulty associated with the query, the query processor 110 transmits the processed query to the answer prediction model 114, the skill prediction model 116, the remediation model 118, or any combination thereof.

At 220, the answer prediction model 114 (executed by processor 102) generates a sample question related to the query. For example, if the query is "how well is User X likely to perform in music theory?" the answer prediction model 114 generates and/or identifies a question of the relevant difficulty related to music theory. The sample question may be a true/false question, multiple choice question, short answer question, composition question, numeric response question, matching question, fill-in-the-blank question, essay question, and/or any other question used for purposes of assessing user performance in an academic subject. For example, a fill-in-the-blank question may be "A ___ is a three-note pattern that fills the duration of a typical two-note pattern." In some instances, the answer prediction model 114 generates multiple (e.g., tens, hundreds, thousands) of sample questions. In some implementations, the answer prediction model 114 retrieves sample questions from a question bank.

At 225, the answer prediction model 114 predicts a user performance on the sample question. In the present example, the answer prediction model 114 can predict whether User X will answer the sample question correctly, thus generating a first answer prediction. The first answer prediction for User X may be binary, non-binary, qualitative, quantitative, and/or explanatory depending on the query and/or the sample question. The first answer prediction can be based on the user information, the user information, the knowledge information, and/or the conversation information. For example, the user information may show that while User X has never taken a music theory class, User X is a pianist and is very likely to know the answer to the sample question.

In instances where the first answer prediction is non-binary and qualitative, the answer prediction model 114 may determine that User X is 83% likely to answer "triplet," 10% likely to answer "thruple," and 7% likely to answer with a different, incorrect answer. In some instances, the first answer prediction is binary, and the answer prediction model 114 indicates User X will answer this question correctly. In some instances, the answer prediction model 116 will assign a difficulty rating to the sample question and include that difficulty rating with the answer prediction, such as in an explanatory prediction that accompanies the answer prediction.

In some implementations, the answer prediction model 114 generates an answer prediction for multiple sample questions and, at 230, provides the answer predictions to the skill prediction model 116.

At 235, the skill prediction model 116 (executed by processor 102) generates a skill prediction based on the answer prediction received from the answer prediction model 114. In some implementations, such as when the answer prediction model 114 generates multiple answer predictions, the skill prediction model 116 runs simulations on the answer predictions to generate the skill prediction. For example, the answer prediction model 114 can generate 1000 answer predictions, each including an accuracy probability (e.g., likelihood that User X got the question correct) and a difficulty rating (e.g., how difficult is this question, either compared to the other questions or compared to the entire subject matter). With those answer predictions, the skill prediction model 116 can run multiple (e.g., tens of, hundreds of, thousands of, etc.) simulations to simulate how User X's likely performance on an exam with 1000 question and User X's likely grasp of the concept.

In some implementations, the skill prediction model 116 may use item response theory (IRT) to establish a skill prediction. While IRT herein is described in reference to processing questions, IRT can be used for any type of interaction type (e.g., data type) that can be indicative of the performance of a user. In some implementations, IRT can include one or more machine learning models to execute different portions of IRT, as described herein. Unlike other testing alternatives, TRT is based on the difficulty of each question in measuring a user's understanding of a topic based on exam questions. For example, the difficulty can be defined, using a machine learning model, based on a relative complexity score. The skill prediction model 116 can determine the relative complexity score based on a percentage of unique question attempts answered correctly. For example, the relative complexity score can include values from −3 to 3. For example, the relative complexity score can correspond to difficulties such as very easy, easy, medium, difficult, and very difficult.

IRT is also based on a pseudoguessing parameter, which is the "guessability" of each question, or the probability that someone with little to no understanding of a topic will still get the question correct. For example, the pseudoguessing parameter can be determined by a machine learning model as a weighted value that indicates how likely a user may answer a question correctly just based on luck. For example, a four-answer multiple choice questions may have a pseudoguessing parameter of 0.25, a true-false questions may have a pseudoguessing parameter of 0.5, and a short-answer question may have a pseudoguessing parameter of about 0, where the higher number indicates a larger probability that a user may answer the question correctly.

The TRT is also based on an item discrimination index. The item discrimination index is a value defined by a machine learning model that indicates the extent to which success on a question corresponds to and/or predicts success on a larger set of questions, such as an exam, test, problem set, etc. The item discrimination index can include a positive index that indicates that data (e.g., question, etc.) is productive or a negative index that indicates that the data undermines success. For example, the item discrimination index can be based on data from a plurality of users and how frequently users with higher relative knowledge interact with data. If higher relative knowledge users frequently interact with data successfully, that data may be assigned a positive index. In some implementations, the item discrimination index can be computed from user groups including substantially equal number of high relative knowledge users and low relative knowledge users. In some implementations, the item discrimination index can be computed using point-biserial correlation coefficients to estimate the discrimination value of a question. The discrimination value can be a positive or negative value that indicates how productive the discrimination index is. In some implementations, if the item discrimination index is determined to be negative or within a predefined range of zero for a subset of data, the subset of data can be stored separately for review. In some implementations, the subset of data can be reviewed by a subject matter expert.

In some implementations, the skill prediction model 116 is configured to run multiple IRT simulations for User X based on the answer predictions provided by the answer prediction model 114. Relevant in an IRT simulation is that each question is a dependent event, meaning that question 2 is influenced by whether question 1 is answered correctly, question 3 is influenced by whether question 2 is answered correctly, and so on.

As an illustrative example, suppose the answer prediction model 114 generates and predicts the performance to 1000 questions, where question 1 has the lowest difficulty and question 1000 has the highest difficulty rating. In a first testing simulation run by the skill prediction model 116, the skill prediction model 116 starts with question 500, which, according to the answer prediction model 114, User X has a 75% chance of answering correctly. Accordingly, a correct response to this first question (question 500) means that the second question will be more difficult (>500), and an incorrect response to this first question means that the second question presented will be less difficult (<500).

If the skill prediction model 116 runs 100 simulations, 75 of those simulations will include User X getting the first question correct and moving onto a more difficult question. The answer prediction model 114 indicates that User X has only a 50% chance of getting this, second more difficult question (say, question 632) correct. Of the simulations that start with a correct answer to question 500 and present next question 623, the skill prediction model 116 will simulate that User X gets this question wrong half the time, meaning that the third question will be less difficult than question 623.

In some implementations, not all simulations will start on question 500, and not all simulations that start on question 500 will then simulate question 623 as the second question. As can be appreciated, IRT is computationally efficient, as a skill prediction can be formed without having to simulate User X's performance to every question. In such instances, the answer prediction model 114 can have hundreds of thousands of answer predictions and the skill prediction model 116 can generate a skill prediction for thousands of users.

In some implementations, the answer prediction model 114 and the skill prediction model 116 work simultaneously and/or in concert to generate a skill prediction for User X. It can be computationally burdensome for the answer prediction model 114 to generate 1000 unique questions on a subject and then predict User X's response to each of those 1000 questions. In some embodiments, the answer prediction model 114 generates each question after generating User X's answer prediction to that answer, then generates the second question based on the skill prediction model 116 and the answer prediction to the first question. Where the answer prediction model 114 predicts User X will answer the first question incorrectly, the answer prediction model 114 can generate a second question easier than the first question and then generate an answer prediction to this second question. In some instances, the difficulty of this second question can be determined based on the user information, the user information, the knowledge information, and the conversation information. Where the answer prediction is non-binary, qualitative, or quantitative, the answer prediction can be used to prompt the answer prediction model 114 to generate a more sophisticated question of a more specific difficulty (if User X was predicted to get the first question wrong, the second question generated and prediction may be different depending on whether User X had a 25% chance of getting question 1 wrong, a 26% chance of getting question 1 wrong, or an 80% chance of getting question 1 wrong).

In this way, the answer prediction model 114 does not have to complete the computationally intensive task of creating a "bank" of questions each time a skill prediction is requested. Instead, generating each question after predicting the response to the previous question simulates an exam taken from a question bank filled with a theoretical infinite amount of questions. Further, in some implementations, since sample questions are generated at the time of the request, the skill prediction is not based on answers to obsolete questions, as can be the case with IRT systems based on an unchanging question bank.

In some implementations, the answer prediction model 114 has access to a question bank or future exam. For example, in instances where the query is "how will User X perform on exam Y?" the answer prediction model 114 can predict the user's answers to these questions, the answer prediction model 114 can assign a difficulty to each question, and the skill prediction model 116 can generate a skill prediction based on the answer prediction and the question difficulty. Where the exam is relatively short, or the order of the questions is pre-determined, the skill prediction model 116 may simulate every test scenario. Where the exam is longer, or the order of the questions has not been determined, the skill prediction model 116 may simulate the exam using IRT or a similar theory. Notably, sixteen true/false questions can be organized in over 20 trillion different ways, and the same exam can be answered in twice as many ways. It may be computationally impractical for the skill prediction model 116 to simulate every possible outcome, especially where the answer to each question informs the probability of getting the next question correct.

Returning to FIG. 2, at 240, the prediction system 100 presents the skill prediction. The skill prediction may be presented on the admin device 130, one or all of the user devices 140, a remote device in communication with the prediction system 100 via the network 120, or stored in the databases 150. The skill prediction may be presented as a value on a scale, such as "62/100," or as a percentile ($62^{nd}$ percentile). In some embodiments, such as where a class of users receives a skill prediction, the prediction system 100 can present a distribution of users presented on a grid in comparison to one another. The distribution can be one-dimensional (e.g., each student receives a class rank), or the distribution can presented be on a two-dimensional plot (e.g., comparing each user's present skill prediction with an estimate of that user's growth potential).

Referring now to FIG. 3, a method 300 of generating an answer prediction is shown, according to an example embodiment. At 305, a representation associated with a behavior of one or more users in created. In some instances, the representation is created by the processor 102 of FIG. 1. In some instances, the representation is provided to the prediction system 100 by a compute device separate from the prediction system 100. In some instances, the representation is a knowledge graph, such as the answer knowledge graph. The answer knowledge graph can be generated, at least in part, by a machine learning model and/or a large language model. In some implementations, the answer knowledge graph can at least partially be curated by an expert.

At 310, the answer prediction model 114 is pre-trained with the representation. In some instances, the processor 102 pre-trains the answer prediction model 114 with the answer knowledge graph. In some implementations, the answer prediction model 113 is pre-trained with various representations, where one of the representations is the answer knowledge graph.

At 315, the prediction system 100 receives a query requesting an answer prediction. In some instances, the query is provided by a device external to the prediction system 100, such as the admin device 130, one of the user devices 140, the conversation model 160, and/or a compute device external to the prediction system 100 and in communication with the prediction system 100 via the network 120. In some instances, the query is received from the skill prediction model 116 or the remediation model 118. In some instances, the query processor 110 receives the query before processing the query and providing the processed query to the answer prediction model 114.

At 320, the answer prediction model 114 generates an answer prediction. The answer prediction may be binary, non-binary, quantitative, qualitative, explanatory, or any combination thereof. In some instances, the answer prediction model 114 generates one or more answer predictions. In some instances, the answer prediction model 114 generates the answer prediction for a question provided to the answer prediction model 114 from the admin device 130, such as from a future exam, a test bank, and/or the like. In some implementations, the answer prediction model 114 generates a question and provides an answer prediction for the generated question.

At 325, the answer prediction is stored. The answer prediction may be stored in the databases 150 and/or the memory 104 shown in FIG. 1. The answer prediction may be stored along with metadata describing the answer prediction, such as when the answer prediction was requested, for which user the answer prediction was requested, and from which device the answer prediction was requested.

At 330, the answer prediction is presented. The answer prediction may be presented to the same device that provided the query. In some instances, the answer prediction is presented to a device separate from the device that provided the query. For example, if one of the user devices 140 requested an answer prediction, the answer prediction may be presented to the admin U1 via the admin device 130 and/or to the user U via a user device 140.

At 335, the answer prediction is used to retrain the answer prediction model 114, the skill prediction model 116, and/or the remediation model 118. In some embodiments, the answer prediction is first used to update the answer knowledge graph, the skill knowledge graph, and/or the remediation knowledge graph before being used to retrain the associated model. In some instances, such as for security purposes, the metadata associated with the answer prediction is deleted after the answer prediction has been incorporated into a knowledge graph and/or used to retrain a model. Moreover, the user's actual answer and how that corresponds to the associated prediction can be used to retrain the answer prediction model 114, the skill prediction model 116, and/or the remediation model 118.

FIG. 4 shows a method of generating an action plan, according to an example embodiment. At 405, a representation associated with a behavior of one or more users is created and/or defined. In some instances, the representation is created and/or defined by the processor 102. In some instances, the representation is provided to the prediction system 100 by a compute device separate from the prediction system 100. In some instances, the representation is a knowledge graph, such as the remediation knowledge graph. The remediation knowledge graph can be generated, at least in part, by a machine learning model and/or a large language model. In some implementations, the remediation knowledge graph can at least partially be curated by an expert.

At 410, the remediation model 118 is pre-trained with the representation. In some instances, the processor 102 pre-trains the remediation model 118 with the remediation knowledge graph. In some implementations, the remediation model 118 is pre-trained with various representations, where one of the representations is the remediation knowledge graph.

At 415, the prediction system 100 receives a query requesting an action plan. In some instances, the query is provided by a device external to the prediction system 100, such as the admin device 130, one of the user devices 140, the conversation model 160, or a compute device external to the prediction system 100 and in communication with the prediction system 100 via the network 120. In some instances, the query is received from the skill prediction model 116 or the answer prediction model 114. In some instances, the query processor 110 receives the query before processing the query and providing the processed query to the remediation model 118.

At 420, the remediation model 118 generates an action plan. In some instances, the remediation model 118 generates two or more action plans, such as one action plan for the user associated with the user device 140 and one action plan for the admin U1 of the user device 130.

At 425, the action plan is stored. The action plan may be stored in the databases 150 and/or the memory 104. The action plan may be stored along with metadata describing the action plan, such as when the action plan was requested, for which user and/or admin U1 the action plan was requested, and from which device the action plan was requested.

At 430, the action plan is presented. The action plan may be presented to the same device that provided the query. In some instances, the action plan is presented to a device separate from the device that provided the query. For example, if one of the user devices 140 requested an action plan, the action plan may be presented to the admin U1 via the admin device 130 and/or to the user U via a user device 140.

At 435, the prediction system 100 monitors compliance with the action plan. For example, as the user associated with one of the user devices 140 follows the action plan (e.g., interacts with conversation model 160, takes additional tests and/or quizzes, performs additional assignments, researches additional topics, etc.), the prediction system 100 can monitor how well the user is following the action plan and whether the action plan is improving user performance and understanding in the desired subject matter.

At 440, the action plan and data related to the compliance and success of the action plan are used to retrain one of the answer prediction model 114, the skill prediction model 116, and/or the remediation model 118. In some embodiments, the action plan is first used to update the answer knowledge graph, the skill knowledge graph, and/or the remediation knowledge graph before being used to retrain the associated model. In some instances, such as for security purposes, the metadata associated with the action plan is deleted after the action plan has been incorporated into a knowledge graph and/or used to retrain a model.

Figure 5:
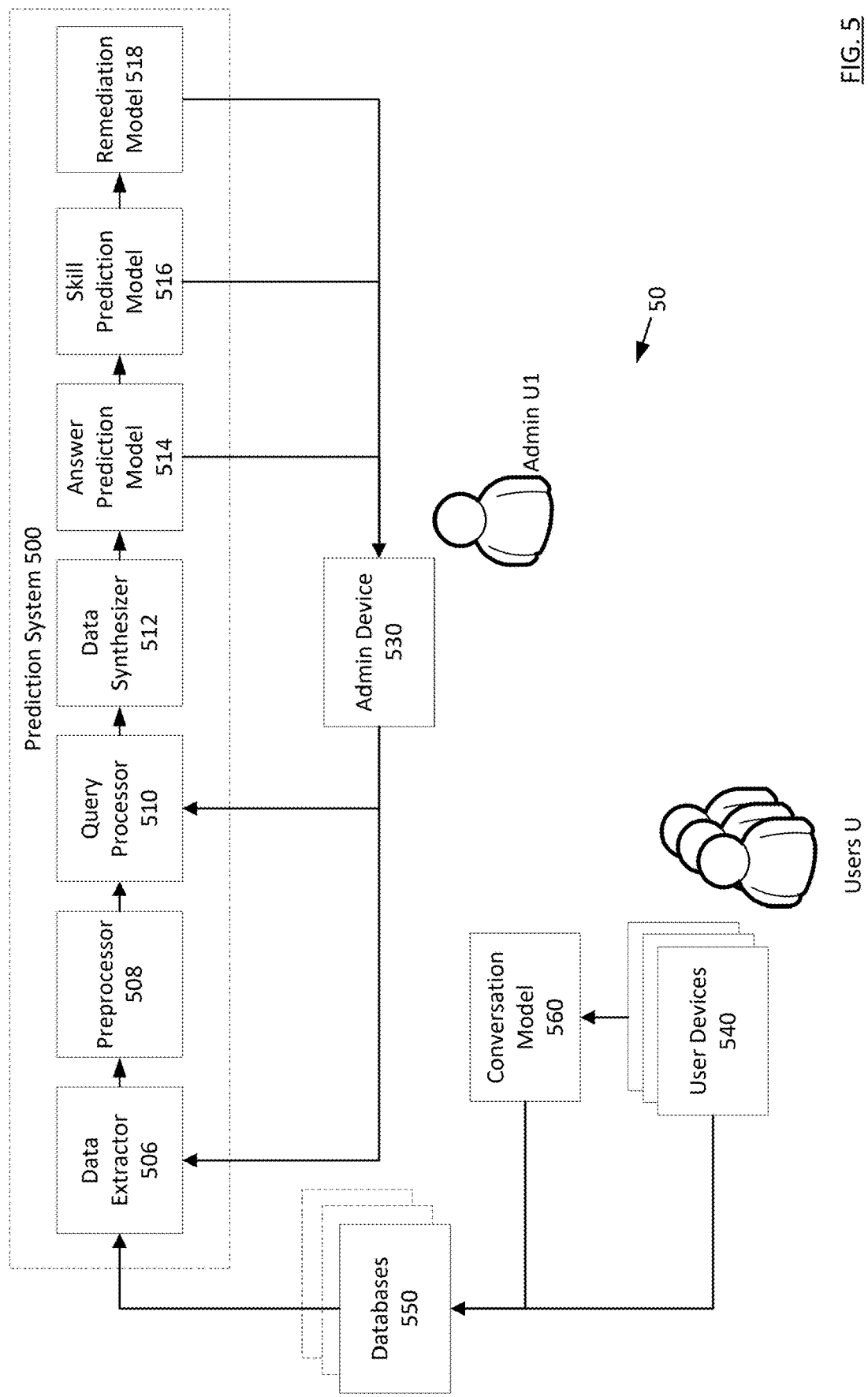
FIG. 5 shows a block diagram for a system for predicting future performance, according to an example embodiment.

FIG. 5 shows a block diagram of a system 50 for processing data to predict a user's future performance and future skill level, according to an embodiment. The system 50 includes a prediction system 500, an admin device (e.g., primary compute device, hub, superior device, first compute device) 530, user devices (e.g., secondary compute device(s), node(s), etc.) 540, databases 550 and a conversation model 560. In some embodiments, the system 50 is associated with an entity (commercial entity, educational entity, etc.), including and/or associated with admin U1 and/or users U. In some embodiments, the prediction system 500, the admin device 530, the user devices 540, the databases 550, and the conversation model 560 can be structurally and/or functionally the same or similar to the prediction system 100, the admin device 130, the user devices 140, the databases 150, and the conversation model 160 as described above with reference to FIGS. 1-4. Thus, certain aspects of the prediction system 500, the admin device 530, the user devices 540, the databases 550, and the conversation model 560 are not described in greater detail herein.

The prediction system 500 includes a data extractor 506, a preprocessor 508, a query processor 510, a data synthesizer 512, an answer prediction model 514, a skill prediction model 516, and a remediation model 518. In some embodiments, the data extractor 506, the preprocessor 508, the query processor 510, the data synthesizer 512, the answer prediction model 514, the skill prediction model 516, and the remediation model 518 are structurally and/or functionally similar to the data extractor 106, the preprocessor 108, the query processor 110, the data synthesizer 112, the answer prediction model 114, the skill prediction model 116, and the remediation model 118 as described above with reference to FIGS. 1-4. Thus, certain aspects of the data extractor 506, the preprocessor 508, the query processor 510, the data synthesizer 512, the answer prediction model 514, the skill prediction model 516, and the remediation model 518 are not described in greater detail herein.

In some implementations, the conversation model 560 is provided on an intranet accessible to the user devices 540 and not to compute devices external to the system 50. As the user devices 540 interact with (e.g., converse with, ask questions to, seek help from) the conversation model 560, those interactions are stored in the databases 550. The data extractor 506 then extracts the relevant data from those conversation model interactions. Interactions with the conversation model 560 may be used to update knowledge graphs (e.g., the answer knowledge graph, the skill knowledge graph, the remediation knowledge graph), train the models (e.g., the answer prediction model 514, the skill prediction model 516, the remediation model 518), generate a prediction (e.g., answer prediction, skill prediction), and generate an action plan.

Isolating the conversation model 560 within an intranet can increase security and the integrity of the models of the prediction system 500 by preventing external interactions with the conversation model 560, such as from an external compute device coupled via a network, from adding data to the databases 550.

The admin device 530 is in communication with each of the answer prediction model 514, the skill prediction model 516, and the remediation model 518. Such a configuration may be desirable where the answer prediction, the skill prediction, and the action plan are highly confidential and cybersecurity is a consideration. In some embodiments, a second admin device can be communicatively coupled to the prediction system 500 selectively such that the second admin device can receive an answer prediction from the answer prediction model 514, but would not be able to receive a skill prediction from the skill prediction model 516 or an action plan from the remediation model 518.

In some implementations, the user devices 540 are selectively communicatively coupled to the prediction system 500 such that the user devices 540 are prevented from receiving information, such as an answer prediction, a skill prediction, or an action plan, directly from the prediction system 500. In such implementations, the user devices 540 are configured to send information to the prediction system 500 through the databases 550 and the data extractor 506.

FIG. 6 shows an answer prediction presented on an output device, according to an embodiment. The answer prediction may be presented on a display 602 and overlayed on other information also present on the display 602. The answer prediction may be presented in a pop-up window 600 that includes a question 604, possible answers 606, a student 608, and an answer prediction 610. For example, the pop-up window 600 shows that DG, one of the students 608, is predicted to miss the sample question 604. In some instances, such as when an answer prediction is requested for a class of students, the students 608 can be organized as shown, where those positioned under the "Predicted to miss" answer prediction are likely to get the sample question 604 incorrect, those positioned under the "Predicted to get correct" answer prediction are likely to get the sample question 604 correct, and those positioned under the "Not enough data" are not associated with enough data for the answer prediction model 114, 514 to make an answer prediction for that student that meets the threshold certainty.

FIG. 7 shows a skill prediction presented on an output device, according to an embodiment. The skill prediction may be presented on the display 702 and overlayed on other information also present on the display 702. The skill prediction may be presented graphically on a plot 720 that includes the student 722 and the student's skill prediction 724. The skill prediction 724 is a quantitative measure that is presented qualitatively between "beginning" and going up through "mastery." Along the right-hand side of the display 702 is a question chart 726 that shows the sample questions (in this example, fifteen) and the class's predicted outcome for each question.

While shown and described herein as being used to predict a student's performance and/or skill level in an educational setting and/or context, in other implementations, the systems and methods described herein can be used for any other suitable predictive purpose. For example, the predictive systems and methods described herein can be used to predict the success an individual might have in a particular role and/or job, predict the performance of a company, predict the performance of a system for a particular task, and/or the like.

In some embodiments, a non-transitory processor-readable medium stores code representing instructions to be executed by one or more processors. The instructions include code to cause the one or more processors to receive interaction data associated with a user, the interaction data including more than one interaction type. The instructions include code to cause the one or more processors to provide the interaction data as input to a first machine learning model to generate a vector representation of the interaction data. The vector representation defines similarity measures between subsets of the interaction data regardless of interaction type. The instructions include code to cause the one or more processors to update, based on the vector representation, a knowledge graph. The instructions include code to cause the one or more processors to retrieve, based on a target for a prediction associated with a capability level of the user, data associated with the user. The instructions include code to cause the one or more processors to provide the target as input to a second machine learning model to define a relative complexity score for the data associated with user. The instructions include code to cause the one or more processors to provide a format associated with the data associated with the user as input to a third machine learning model to generate pseudoguessing weights for the data associated with the user. The instructions include code to cause the one or more processors to provide point-biserial correlation coefficients associated with the data as input to a fourth machine learning model to generate an item discrimination index for the data associated with the user. The instructions include code to cause the one or more processors to generate at least one prediction associated with the target by providing the relative complexity score, the pseudoguessing weights, and the item discrimination index as input to an auto regressive transformer trained on the knowledge graph. The instructions include code to cause the one or more processors to provide the at least one prediction as input to a fifth machine learning model to generate a plurality of simulations. The instructions include code to cause the one or more processors to identify, based on the plurality of simulations, the prediction associated with the capability level of the user.

In some implementations, the plurality of simulations is based on item response theory (IRT).

In some implementations, the instructions further include code to cause the one or more processors to extract, from the target, an identified context, wherein defining the relative complexity score is based on the identified context.

In some implementations, the identified context is a subject associated with the user.

In some implementations, defining the item discrimination index is based on data associated with a plurality of students, the plurality of students including relatively high knowledge students and relatively low knowledge students.

In some implementations, the instructions further include code to cause the one or more processors to receive user information associated with the user and update the knowledge graph based on the user information.

In some implementations, the user information includes at least one of user device information, a user profile, chatbot conversations, input device information, explored content, or student device conversations.

In some implementations, the more than one interaction type includes more than one of conversation data, assessment data, assignment data, question data, or engagement data.

In some implementations, the at least one prediction includes a probability associated with the target.

In some embodiments, a non-transitory processor-readable medium stores code representing instructions to be executed by one or more processors. The instructions include code to cause the one or more processors to receive interaction data, the interaction data including more than one interaction type. The instructions include code to cause the one or more processors to provide the interaction data to as an input to a first machine learning model to generate a vector representation of the interaction data, the vector representation defining similarity measures between subsets of the interaction data regardless of interaction type. The instructions include code to cause the one or more processors to generate, based on the vector representation, a knowledge graph. The instructions include code to cause the one or more processors to train a transformer based on the knowledge graph. The instructions include code to cause the one or more processors to retrieve, based on a target for a prediction associated with a capability level of a user, data associated with the user. The instructions include code to cause the one or more processors to provide as context associated with the target as an input to a second machine learning model to define a relative complexity score for the data associated with user. The instructions include code to cause the one or more processors to provide a format associated with the data associated with the user as an input to a third machine learning model to define pseudoguessing weights for the data associated with the user. The instructions include code to cause the one or more processors to provide point-biserial correlation coefficients associated with the data as an input to a fourth machine learning model to define an item discrimination index for the data associated with the user based on. The instructions include code to cause the one or more processors to generate at least one prediction associated with the target by providing the relative complexity score, the pseudoguessing weights, and the item discrimination index as an input to the transformer. The instructions include code to cause the one or more processors to provide the at least one prediction to a fifth machine learning model to generate a plurality of simulations. The instructions include code to cause the one or more processors to identify, based on the plurality of simulations, the prediction associated with the capability level of the user.

In some implementations, generating the vector representation is based on semantic similarities between the data in the interaction data.

In some implementations, the first machine learning model is a natural language model.

In some implementations, each of the second machine learning model, the third machine learning model, and the fourth machine learning model is a different type of machine learning model.

In some implementations, the plurality of simulations is based on item response theory (IRT).

In some embodiments, an apparatus includes one or more memories and one or more processors operatively coupled to the one or more memories. The one or more processors are configured to retrieve, based on a target for a prediction associated with a capability level of a user, data associated with the user, the data associated with a knowledge graph. The one or more processors are configured to provide the target as an input to a first machine learning model to generate a vector representation of the target. The one or more processors are configured to update the knowledge graph based on the vector representation. The one or more processors are configured to provide a context associated with the target as an input to a second machine learning model to define a relative complexity score for the data associated with the user. The one or more processors are configured to provide a format associated with the data associated with the user as an input to a third machine learning model to define pseudoguessing weights for the data associated with the user. The one or more processors are configured to provide point biserial correlation coefficients associated with the data to a fourth machine learning model to define an item discrimination index for the data associated with the user. The one or more processors are configured to generate at least one prediction associated with the target by providing the relative complexity score, the pseudoguessing weights, and the item discrimination index as an input to a transformer trained on the knowledge graph. The one or more processors are configured to provide the at least one prediction to a fifth machine learning model to generate a plurality of simulations. The one or more processors are configured to identify, based on the plurality of simulations, the prediction associated with the capability level of the user.

In some implementations, the plurality of simulations is based on item response theory (IRT).

In some implementations, the data associated with the knowledge graph includes more than one of conversation data, assessment data, assignment data, question data, or engagement data.

In some implementations, the transformer is an auto regressive transformer model.

In some implementations, the one or more processors are configured to define a subset of data, wherein the subset of data includes data with at least one of an item discrimination index below zero or an item discrimination index within a predefined threshold of zero and store the subset of data in a database for review.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory processor-readable medium storing code representing instructions to be executed by one or more processors, the instructions comprising code to cause the one or more processors to:
   receive interaction data associated with a user, the interaction data including more than one interaction type;
   provide the interaction data as input to a first machine learning model to generate a vector representation of the interaction data, the vector representation defining similarity measures between subsets of the interaction data regardless of interaction type;
   remove, from the vector representation, similarity measures below a predetermined threshold, the predetermined threshold associated with a bi-partite graph;
   update, based on the vector representation, a knowledge graph associated with relationships between units from clusters of units;
   train, based on the knowledge graph, an auto regressive transformer;
   retrieve, based on a target for a prediction associated with a capability level of the user, data associated with the user, the target associated with at least one unit from the clusters of units;
   provide the target as input to a second machine learning model to define a relative complexity score for the data associated with user;
   provide a format associated with the data associated with the user as input to a third machine learning model to generate pseudoguessing weights for the data associated with the user;
   provide point-biserial correlation coefficients associated with the data as input to a fourth machine learning model to generate an item discrimination index for the data associated with the user;
   generate at least one prediction associated with the target by providing the relative complexity score, the pseudoguessing weights, and the item discrimination index as input to the auto regressive transformer;
   provide the at least one prediction as input to a fifth machine learning model to generate a plurality of simulations; and
   identify, based on the plurality of simulations, the prediction associated with the capability level of the user.

2. The non-transitory processor-readable medium of claim 1, wherein the plurality of simulations is based on item response theory (IRT).

3. The non-transitory processor-readable medium of claim 1, wherein the instructions further comprise code to cause the one or more processors to:
   extract, from the target, an identified context, wherein defining the relative complexity score is based on the identified context.

4. The non-transitory processor-readable medium of claim 3, wherein the identified context is a subject associated with the user.

5. The non-transitory processor-readable medium of claim 1, wherein generating the item discrimination index is based on data associated with a plurality of students, the plurality of students including relatively high knowledge students and relatively low knowledge students.

6. The non-transitory processor-readable medium of claim 1, wherein the instructions further comprise code to cause the one or more processors to:
 receive user information associated with the user; and
 update the knowledge graph based on the user information.

7. The non-transitory processor-readable medium of claim 6, wherein the user information includes at least one of user device information, a user profile, chatbot conversations, input device information, explored content, or user device conversations.

8. The non-transitory processor-readable medium of claim 1, wherein the more than one interaction type includes more than one of conversation data, assessment data, assignment data, question data, or engagement data.

9. The non-transitory processor-readable medium of claim 1, wherein the at least one prediction includes a probability associated with the target.

10. A non-transitory processor-readable medium storing code representing instructions to be executed by one or more processors, the instructions comprising code to cause the one or more processors to:
 receive interaction data, the interaction data including more than one interaction type;
 provide the interaction data to as an input to a first machine learning model to generate a vector representation of the interaction data, the vector representation defining similarity measures between subsets of the interaction data regardless of interaction type;
 remove, from the vector representation, similarity measures below a predetermined threshold, the predetermined threshold associated with a bi-partite graph;
 generate, based on the vector representation, a knowledge graph associated with relationships between units of clusters of units;
 train a transformer based on the knowledge graph;
 retrieve, based on a target for a prediction associated with a capability level of a user, data associated with the user, the target associated with at least one unit from the clusters of units;
 provide a context associated with the target as an input to a second machine learning model to define a relative complexity score for the data associated with the user;
 provide a format associated with the data associated with the user as an input to a third machine learning model to define pseudoguessing weights for the data associated with the user;
 provide point-biserial correlation coefficients associated with the data as an input to a fourth machine learning model to define an item discrimination index for the data associated with the user;
 generate at least one prediction associated with the target by providing the relative complexity score, the pseudoguessing weights, and the item discrimination index as an input to the transformer;
 provide the at least one prediction to a fifth machine learning model to generate a plurality of simulations; and
 identify, based on the plurality of simulations, the prediction associated with the capability level of the user.

11. The non-transitory processor-readable medium of claim 10, wherein generating the vector representation is based on semantic similarities between the data in the interaction data.

12. The non-transitory processor-readable medium of claim 10, wherein the first machine learning model is a natural language model.

13. The non-transitory processor-readable medium of claim 10, wherein each of the second machine learning model, the third machine learning model, and the fourth machine learning model is a different type of machine learning model.

14. The non-transitory processor-readable medium of claim 10, wherein the plurality of simulations is based on item response theory (IRT).

15. The non-transitory processor-readable medium of claim 10, wherein the more than one interaction type includes more than one of conversation data, assessment data, assignment data, question data, or engagement data.

16. An apparatus comprising:
 one or more memories; and
 one or more processors operatively coupled to the one or more memories, the one or more processors configured to:
  retrieve, based on a target, associated with at least one unit from clusters of units, for a prediction associated with a capability level of a user, data associated with the user, the data associated with a knowledge graph associated with relationships between units of the clusters of units;
  provide the target as an input to a first machine learning model to generate a vector representation of the target;
  remove, from the vector representation, one or more representations having a similarity value below a predetermined threshold, the predetermined threshold associated with a bi-partite graph;
  training a transformer based on the knowledge graph;
  update the knowledge graph based on the vector representation;
  provide a context associated with the target as an input to a second machine learning model to define a relative complexity score for the data associated with the user;
  provide a format associated with the data associated with the user as an input to a third machine learning model to define pseudoguessing weights for the data associated with the user;
  provide point biserial correlation coefficients associated with the data to a fourth machine learning model to define an item discrimination index for the data associated with the user;
  generate at least one prediction associated with the target by providing the relative complexity score, the pseudoguessing weights, and the item discrimination index as an input to the transformer;
  provide the at least one prediction to a fifth machine learning model to generate a plurality of simulations; and
  identify, based on the plurality of simulations, the prediction associated with the capability level of the user.

17. The apparatus of claim 16, wherein the plurality of simulations is based on item response theory (IRT).

18. The apparatus of claim 16, wherein the data associated with the knowledge graph includes more than one of conversation data, assessment data, assignment data, question data, or engagement data.

19. The apparatus of claim 16, wherein the transformer is an auto regressive transformer model.

20. The apparatus of claim 16, wherein the one or more processors are further configured to:
- define a subset of data, wherein the subset of data includes data with at least one of an item discrimination index below zero or an item discrimination index within a predefined threshold of zero; and
- store the subset of data in a database for review.

21. The apparatus of claim 16, wherein the target is a request for information associated with a future user skill prediction.

* * * * *